(12) United States Patent  
Ying et al.

(10) Patent No.: US 11,183,947 B2
(45) Date of Patent: Nov. 23, 2021

(54) MODULAR POWER SUPPLY SYSTEM

(71) Applicant: Delta Electronics (Shanghai) CO., LTD, Shanghai (CN)

(72) Inventors: Jianping Ying, Shanghai (CN); Ming Wang, Shanghai (CN); Xiaobo Huang, Shanghai (CN); Jun Liu, Shanghai (CN); Zhiming Hu, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 46 days.

(21) Appl. No.: 16/465,741

(22) PCT Filed: Dec. 15, 2017

(86) PCT No.: PCT/CN2017/116352
§ 371 (c)(1),
(2) Date: May 31, 2019

(87) PCT Pub. No.: WO2018/108141
PCT Pub. Date: Jun. 21, 2018

(65) Prior Publication Data
US 2020/0044555 A1 Feb. 6, 2020

(30) Foreign Application Priority Data

Dec. 16, 2016 (CN) .......................... 201611170857.3
Dec. 21, 2016 (CN) .......................... 201611191912.7
(Continued)

(51) Int. Cl.
H03K 5/22 (2006.01)
H02M 7/483 (2007.01)
H02M 7/49 (2007.01)

(52) U.S. Cl.
CPC ............. *H02M 7/483* (2013.01); *H02M 7/49* (2013.01); *H02M 7/4835* (2021.05)

(58) Field of Classification Search
CPC . H02M 7/483; H02M 7/49; H02M 2007/4835
(Continued)

(56) References Cited

U.S. PATENT DOCUMENTS 7,705,705 B2 4/2010 Zeng et al.
8,686,746 B2 4/2014 Zhou et al.
(Continued)

FOREIGN PATENT DOCUMENTS

CN 101719727 A 6/2010
CN 101795072 A 8/2010
(Continued)

OTHER PUBLICATIONS

The IN1OA issued Oct. 29, 2019 by the IN Office.
(Continued)

*Primary Examiner* — Metasebia T Retebo
(74) *Attorney, Agent, or Firm* — Qinghong Xu

(57) ABSTRACT

A modular power supply system is configured to include: a main controller, configured to output a main control signal; N local controllers, wherein each of the local controllers is configured to receive the main control signal to output at least one local control signal; N auxiliary power supplies, in one-to-one correspondence with the N local controllers, wherein each of the auxiliary power supplies is configured to provide power to the corresponding local controller, and N power units, in one-to-one correspondence with the N local controllers, wherein each of the power units includes a first end and a second end, the second end of each of the power units is connected to the first end of an adjacent one of the power units, each of the power units is configured to include M power converters, each of the power converters is configured to operate according to the local control signal.

13 Claims, 24 Drawing Sheets

(30) Foreign Application Priority Data

Feb. 27, 2017 (CN) .......................... 201710106946.X
Dec. 12, 2017 (CN) .......................... 201711322796.2

(58) Field of Classification Search
USPC .......................................................... 307/65
See application file for complete search history.

(56) References Cited

U.S. PATENT DOCUMENTS

| | | | |
|---|---|---|---|
| 2005/0237010 | A1 | 10/2005 | Ying et al. |
| 2009/0268496 | A1 | 10/2009 | Tan et al. |
| 2011/0134672 | A1 | 6/2011 | Sato et al. |
| 2012/0032512 | A1 | 2/2012 | Aiello et al. |
| 2013/0148390 | A1 | 6/2013 | Na |
| 2013/0229838 | A1 | 9/2013 | Wang et al. |
| 2014/0015322 | A1 | 1/2014 | Milavec |
| 2015/0062992 | A1 | 3/2015 | Park |
| 2015/0180352 | A1* | 6/2015 | Mester ............... B60L 9/12 363/21.03 |
| 2015/0340890 | A1 | 11/2015 | Yao et al. |
| 2016/0072395 | A1 | 3/2016 | Deboy et al. |
| 2016/0190846 | A1 | 6/2016 | Eckel |
| 2016/0277071 | A1 | 9/2016 | Dzung et al. |
| 2017/0029242 | A1 | 2/2017 | Agirman et al. |
| 2017/0033703 | A1 | 2/2017 | Kikuchi et al. |
| 2017/0187234 | A1* | 6/2017 | Harada ............... H02J 9/061 |

FOREIGN PATENT DOCUMENTS

| | | |
|---|---|---|
| CN | 101917126 A | 12/2010 |
| CN | 201864877 U | 6/2011 |
| CN | 102148579 A | 8/2011 |
| CN | 102364849 A | 2/2012 |
| CN | 101262178 B | 5/2012 |
| CN | 102545675 A | 7/2012 |
| CN | 102593859 A | 7/2012 |
| CN | 102611345 A | 7/2012 |
| CN | 102684543 A | 9/2012 |
| CN | 202616988 U | 12/2012 |
| CN | 103280952 A | 9/2013 |
| CN | 103314517 A | 9/2013 |
| CN | 103326393 A | 9/2013 |
| CN | 103546024 A | 1/2014 |
| CN | 203522498 U | 4/2014 |
| CN | 203562783 U | 4/2014 |
| CN | 103856091 A | 6/2014 |
| CN | 203775065 U | 8/2014 |
| CN | 204044223 U | 12/2014 |
| CN | 104272589 A | 1/2015 |
| CN | 104410101 A | 3/2015 |
| CN | 104426406 A | 3/2015 |
| CN | 103311932 B | 5/2015 |
| CN | 105071403 A | 11/2015 |
| CN | 204858577 U | 12/2015 |
| CN | 103580050 B | 1/2016 |
| CN | 204967648 U | 1/2016 |
| CN | 105356770 A | 2/2016 |
| CN | 103762596 B | 3/2016 |
| CN | 105391313 A | 3/2016 |
| CN | 105406705 A | 3/2016 |
| CN | 105429476 A | 3/2016 |
| CN | 105453405 A | 3/2016 |
| CN | 105490285 A | 4/2016 |
| CN | 106160463 A | 11/2016 |
| CN | 106505896 A | 3/2017 |
| CN | 206332626 U | 7/2017 |
| DE | 102012213055 A1 | 1/2014 |
| EP | 2595302 A1 | 5/2013 |
| EP | 2905889 A1 | 8/2015 |
| EP | 2945273 A1 | 11/2015 |
| FR | 3015146 A1 | 6/2015 |
| TW | 265484 B | 12/1995 |
| TW | 201218604 A | 5/2012 |
| TW | 201306470 A | 2/2013 |
| TW | 201528666 A | 7/2015 |
| TW | 201633691 A | 9/2016 |
| WO | 2009027520 A2 | 3/2009 |
| WO | 2012028640 A2 | 3/2012 |
| WO | 2014037406 A1 | 3/2014 |
| WO | 2018050256 A1 | 3/2018 |

OTHER PUBLICATIONS

The Non-final OA issued Mar. 9, 2018 by the USPTO.
The EESR issued Aug. 7, 2020 by the EPO.
The CN3OA issued Aug. 25, 2020 by the CNIPA.
The CN1OA dated Aug. 27, 2019 by the CNIPA.
Yuebin Zhou et al: "A control system for large-scale modular multilevel converters", Nov. 10, 2013 (Nov. 10, 2013), pp. 163-168, XP032539357,[retrieved on Dec. 30, 2013].
Xiaotian Zhang et al: "Study of Multisampled Multilevel Inverters to Improve Control Performance", Nov. 1, 2012 (Nov. 1, 2012) ,pp. 4409-4416 , XP011448271.
Wu Haibo et al: "Research on energy feedback topologies using in CBB multilevel converter for PMSM drives",Dec. 11, 2013 (Dec. 11, 2013) ,pp. 1-6,XP032605658.
The EESR issued Aug. 13, 2020 by the EPO.
The IN1OA issued Mar. 18, 2020 by the IN Office.
The Non-final OA issued Jun. 11, 2020 by the USPTO.
The First Office Action for CN application No. 201711322795.8 dated Mar. 29, 2019.
The First Office Action for CN application No. 20171 1322794.3 dated Mar. 29, 2019.
The First Office Action for TW application No. 106144104 dated Aug. 3, 2018.
The First Office Action for TW application No. 106144105 dated Aug. 3, 2018.
The First Office Action for TW application No. 106144106 dated Aug. 6, 2018.
The Second Office Action for TW application No. 106144103 dated Dec. 5, 2018.
International Search Report for PCT application No. PCT/CN2017/116354 dated Mar. 16, 2018.
International Search Report for PCT application No. PCT/CN2017/116353 dated Mar. 21, 2018.
The IN1OA issued Dec. 25, 2020 by the IN Office.
The Decision of Rejection dated Feb. 10, 2021 by the CNIPA from application No. 201711322796.2.

* cited by examiner

MODULAR POWER SUPPLY SYSTEM

CROSS-REFERENCE TO RELATED APPLICATIONS

This application is a continuation application of International Application No. PCT/CN2017/116352, filed on Dec. 15, 2017, which is based upon and claims priority to Chinese Patent Application No. 201611170857.3, filed on Dec. 16, 2016, Chinese Patent Application No. 201611191912.7, filed on Dec. 21, 2016. Chinese Patent Application No. 201710106946.X, filed on Feb. 27, 2017, Chinese Patent Application No. 201711322796.2, filed on Dec. 12, 2017, the entire content of all of which is incorporated herein by reference.

TECHNICAL FIELD

The present disclosure relates to the field of power electronics, and particularly to a modular power supply system.

BACKGROUND

Currently, in some applications of high voltage level (such as above 10 kV), such as Static Var Generator (SVG), Medium Variable-frequency Drive (MVD), and High Voltage Direct Current Transmission Light (HVDC-Light), etc., the systems are of high voltage level, and limited by the withstanding voltage level and cost of semiconductor devices, so the systems often adopt a circuit topology of cascaded power units.

The traditional topology of cascaded power units needs to equip a set of optical fiber, auxiliary power supply and local controller for each power unit, i.e., power converter. In such topology of cascaded power units, the number of power units that need to be cascaded increases with the increase of the voltage level, resulting in an increase in the number of optical fibers, auxiliary power supplies and local controllers. Therefore, the design of such a topology is complex, the cost is expensive, and its reliability is low.

FIG. 1 is a schematic structural view of a three-phase SVG system in the prior art. FIG. 2 is a schematic diagram of a more specific three-phase SVG system in the prior art. Each of the SVG systems in FIGS. 1 and 2 includes a three-phase circuit, and power units in each phase of circuit are connected in cascade.

As shown in FIG. 1, each phase of circuit of the SVG system is formed by cascading a plurality of power units 1. The term "cascade" as used herein is well-known in the art. That is, each power unit includes a first end $T_1$ and a second end $T_2$. A second end $T_2$ of one of adjacent two power units is connected to a first end $T_1$ of the other one of the adjacent two power units. The first end $T_1$ of the first power unit of each phase of circuit is connected to a corresponding phase of three-phase lines $U_A$, $U_B$ and $U_C$ of the three-phase power grid via a filter inductor L, and the second ends of the last power units of the three phase of circuit are mutually connected.

As shown in FIG. 2, each phase of circuit of the SVG system is formed by cascading eight power units $P_1$ to $P_8$. Each power unit includes a first end and a second end as shown in FIG. 1, wherein a second end of one of adjacent two power units is connected to a first end of the other one of adjacent two power units. For example, the second end of the power unit $P_1$ is connected to the first end of the power unit $P_2$, the second end of the power unit $P_2$ is connected to the first end of the power unit $P_3$, and so on, and the second end of the power unit $P_7$ is connected to the first end of the power unit P8. Each of the first ends of the three power units $P_1$ in the three-phase circuit is connected to a corresponding phase of phases $U_A$, $U_B$ and $U_C$ of the three-phase grid G by a filter circuit (composed of an inductor L, a resistor R and a capacitor C), wherein the phases $U_A$, $U_B$ and $U_C$ of the three-phase grid G are connected to a load $R_{load}$. The second ends of the three power units $P_8$ in the three-phase circuit are connected to each other. Each power unit includes four power switch devices 2. Each power switch device 2 consists of a power semiconductor switch S and an anti-parallel body diode D or external diode D. A collector of the power semiconductor switch S is connected to a cathode of the diode D, and an emitter of the power semiconductor switch S is connected to an anode of the diode D. Since the power semiconductor switch S and the anti-parallel body diode or external diode D are generally used as a whole, for the sake of brevity, the anti-parallel body diode or external diode D will not be separately mentioned in the following description.

The power unit 1 shown in FIG. 1 may be a full-bridge (H bridge) circuit, or may be other circuit topologies, such as a half-bridge circuit, a rectifier-inverter circuit, and the like. FIG. 3 is a schematic diagram of an H-bridge circuit (topology) in the prior art. For example, taking the power unit being an H-bridge circuit as an example, the H-bridge circuit, as shown in FIG. 3, includes power semiconductor switches $S_1$ to $S_4$ and a DC bus capacitor $C_B$. A first end of the power semiconductor switch $S_1$ is connected to a positive terminal of the DC bus capacitor $C_B$ and a first end of the power semiconductor switch $S_3$. A second end of the power semiconductor switch $S_1$ is connected to a first end of the power semiconductor switch $S_2$. A second end of the power semiconductor switch $S_2$ is connected to a negative terminal of the DC bus capacitor $C_B$ and a second end of the power semiconductor switch $S_4$. A second end of the power semiconductor switch $S_3$ is connected to a first end of the power semiconductor switch $S_4$. The second end of the power semiconductor switch $S_1$ serves as a first output end of the H-bridge circuit, that is, a first end $T_1$ of the power unit 1. A second end of the power semiconductor switch $S_3$ serves as a second output end of the H-bridge circuit, that is, a second end $T_2$ of the power unit 1.

FIG. 4 is a schematic diagram of a single phase SVG in the prior art. As shown in FIG. 4, the single phase SVG includes a charging portion 3, a power portion 4 and a control portion 5. The single phase SVG further includes a plurality of power units 40. Each of the power units 40 includes a first end and a second end as shown in FIG. 1. A first end of one of adjacent two power units 40 is connected to a second end of the other one of the adjacent two power units 40. FIG. 4 is a conventional cascaded solution applied to a 25 kV single phase SVG Each phase of the SVG is formed as one phase by cascading a plurality of power units and then connected to the grid via filters and contactors, respectively. Each power unit 40 of the SVG typically employs one H-bridge circuit. The topology of the H-bridge circuit is shown in FIG. 3 and will not be described here. Each power unit 40 of the SVG system further includes a DC bus capacitor $C_B$, and the connection relationship thereof is as shown in FIG. 4, wherein the charging portion 3 is used to precharge the DC bus capacitor $C_B$, and the control portion 5 is used to control the operation of the power portion 4.

As that can be seen from FIG. 4, in the conventional cascaded topology, in addition to including a main controller 50, each power unit 40, as a power converter, such as an H-bridge circuit, needs to be separately provided with a set of local controller 51, drive circuit 52, auxiliary power supply 53 and optical fiber 54, and the connection relationship thereof is as shown in FIG. 4. The main controller 50 outputs a main control signal to the local controller 51, and the local m am-controller 51 generates a local control signal of the corresponding power unit according to the main control signal and output it to the drive circuit 52. The drive circuit 52 outputs a driving signal according to the local control signal to control the corresponding power unit to operate. For example, a 25 kV single phase SVG may often be implemented by the following two schemes. The first scheme: all power switch devices in the H-bridge circuit use common 1700V Insulated Gate Bipolar Transistors (IGBTs), then a DC bus voltage of the single power unit 40 is 1000V. In consideration of redundancy, a total of 55 stages of power units are needed to be cascaded, so a total of 55 sets of local control boards 51, 55 sets of optical fibers 54 and 55 auxiliary power supplies 53 are required. Such a large number of local controllers 51, optical fibers 54 and auxiliary power supplies 53 will result in extremely complicated structural design of the SVG, the cost is extremely high, and its reliability is low.

The second scheme: the power switch devices in the H-bridge circuit use high voltage IGBTs, such as 3300V IGBTs or even 6500V IGBTs, to increase the voltage level of the single power unit 40. In order to reduce the number of cascaded power units 40, local controllers 51, optical fibers 54 and auxiliary power supplies 53, the second scheme may often be employed. In the second scheme, if the 3300V IGBT is selected, the voltage level of each power unit 40 is doubled of the 1700V IGBT scheme, and the number of cascaded power units 40 may be reduced from 55 to 28, and the number of local controllers 51, optical fibers 54 and auxiliary power supplies 53 and the cost may be reduced by half as well. However, limited to the current level of semiconductor technology development, the cost of 3300V IGBT is still high. Under the same current level, the cost of 3300V IGBT is far expensive than twice the cost of 1700V IGBT. Therefore, the cost of the second scheme will far exceed the cost of the first scheme. If a 6500V IGBT is selected, the cost will be even high.

Therefore, either a cascading scheme using low voltage IGBT power units or a cascading scheme using high voltage IGBT power units has significant disadvantages.

FIG. 5 is a schematic diagram of an HVDC-Light system in the prior art. As shown in FIG. 5, the HVDC-Light includes a three-phase circuit, and each phase of circuit includes an upper half-bridge arm and a lower half-bridge arm. Each of the upper half-bridge arm and the lower half-bridge arm of each phase of circuit includes a plurality of cascaded power units 40 and an inductor L. Each power unit 40 includes a first end and a second end as shown in FIG. 1 as well. A first end of one of the adjacent two power units 40 is connected to a second end of the other one of the adjacent two power units 40. The inductor L of each upper half-bridge arm is connected to the inductor L of the corresponding lower half-bridge arm, and connection points between the two inductors L are respectively connected to the gnd. The connection relationship is as shown in FIG. 5. Each power unit 40 of the HVDC-Light employs a half-bridge converter. Each power unit 40 of the HVDC-Light further includes a DC bus capacitor. Each power unit 40 of the HVDC-Light further needs to be connected to a drive circuit 52. The power unit 40 operates according to a driving signal output by the drive circuit 52. In addition to the main controller 50, each power unit 40 further needs to be provided with a set of local controller 51, optical fiber 54 and auxiliary power supply 53, the connection relationship of which is shown in FIG. 5.

The DC voltage of HVDC-Light is as high as hundreds of kilovolts, and the number of power units 40 to be cascaded is extremely large, so the above-mentioned problems are more serious. That is, the overall structure of HVDC-Light in the prior art is complicated, the cost is expensive, and the reliability is low.

Meanwhile, the power supply mode of the local controller and auxiliary power supply needs to be further considered and improved as well.

In addition, the driving manner of the power semiconductor switches needs to be further considered and improved as well.

SUMMARY

It is an object of the present disclosure to provide a modular power supply system, to simplify the structure of a power electronic system, reduce cost, and improve reliability.

According to an aspect of the disclosure, a modular power supply system is provided, and configured to include: a main controller, configured to output a main control signal; N local controllers, wherein each of the local controllers is configured to receive the main control signal to output at least one local control signal: N auxiliary power supplies, in one-to-one correspondence with the N local controllers, wherein each of the auxiliary power supplies is configured to provide power to the corresponding local controller; and N power units, in one-to-one correspondence with the N local controllers, wherein each of the power units includes a first end and a second end, the second end of each of the power units is connected to the first end of an adjacent one of the power units, and each of the power units is configured to include M power converters, wherein each of the power converters includes a third end and a fourth end, the fourth end of each of the power converters is connected to the third end of an adjacent one of the power converters, and the third end of a first one of the power converters is connected to the first end of the power unit, the fourth end of an M-th one of the power converters is connected to the second end of the power unit, and each of the power converters is configured to operate according to the local control signal output by the corresponding local controller, wherein both N and M are natural numbers greater than one.

In the present disclosure, by constituting a plurality of power converters as one power unit and adopting a set of local controller, optical fiber and auxiliary power supply to control the plurality of power converters, the number of local controllers, optical fibers and auxiliary power supplies may be reduced, the structural design may be simplified, the cost may be reduced, and the reliability may be improved.

The present disclosure solves problems that the modular power supply system has too large amount of control quantities, needs too much hardware resources, has too high cost and too low power density due to too large number of power units. Besides, since the input end of at least one DC-to-DC converter is connected to the two ends of the low voltage bus capacitor, the voltage withstand degree of primary and secondary sides of the transformer of the DC-to-DC converter only needs to be above the low voltage DC bus voltage, which avoids the problem of difficulty in implementation technique.

The present disclosure is applicable to all topology structures connected by AC/DC, DC/AC, DC/DC power converters, and is widely used.

BRIEF DESCRIPTION OF THE DRAWINGS

The above and other objects, features and advantages of the present disclosure will become more distinct from exemplary embodiments described in detail with reference to accompanying drawings.

DETAILED DESCRIPTION

Figure 1:
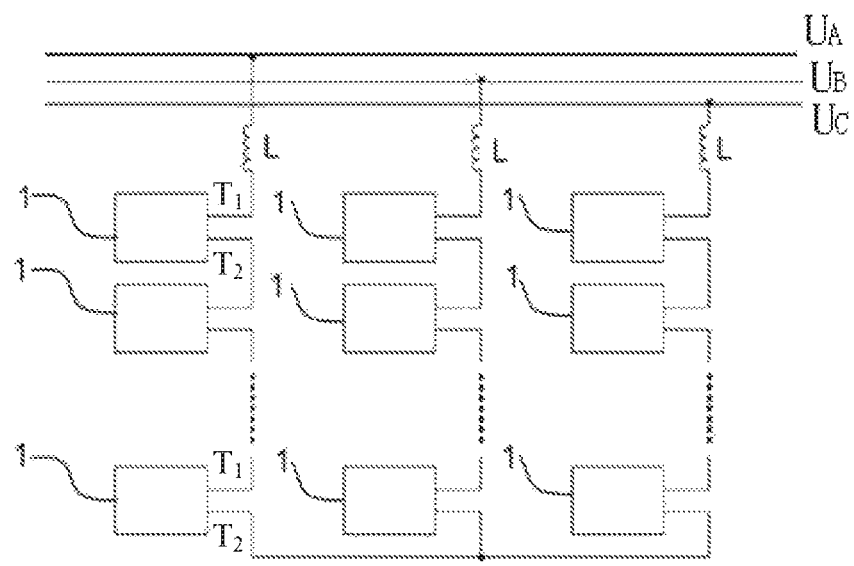
FIG. 1 is a schematic structural view of a three-phase SVG system in the prior art.
Figure 2:
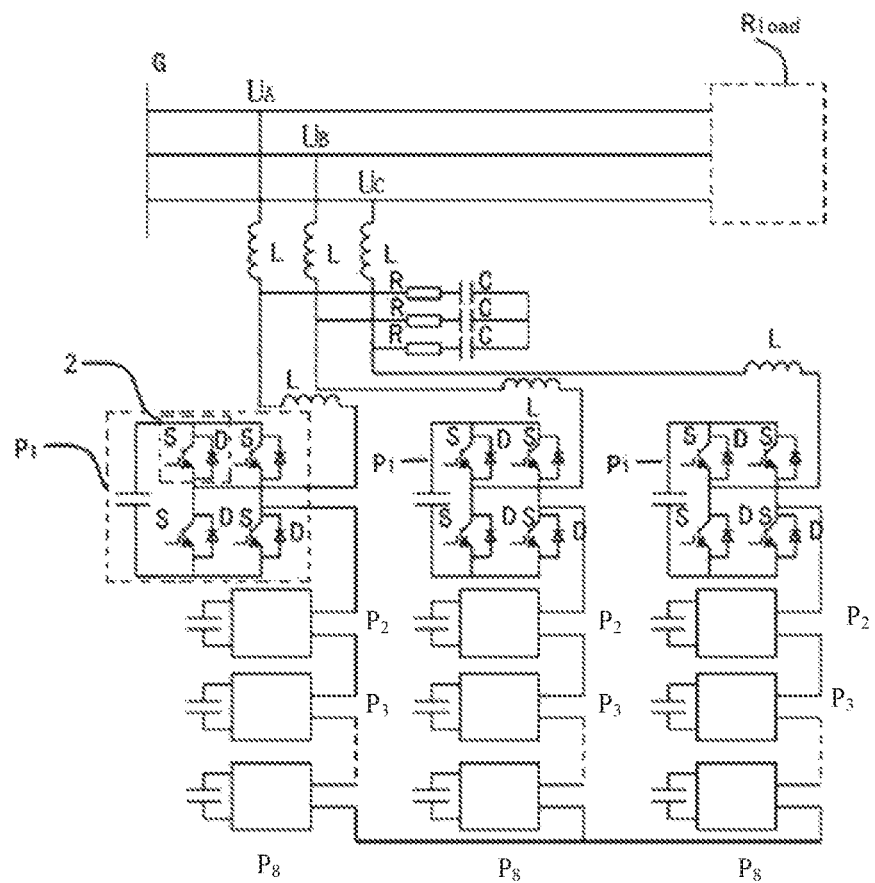
FIG. 2 is a schematic diagram of a more specific three-phase SVG system in the prior art.
Figure 3:
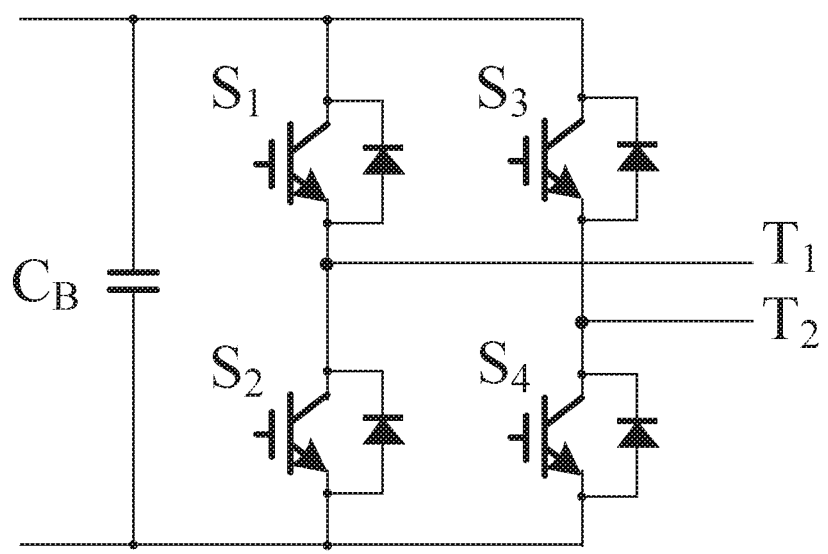
FIG. 3 is a schematic diagram of an H-bridge circuit (topology) in the prior art.
Figure 4:
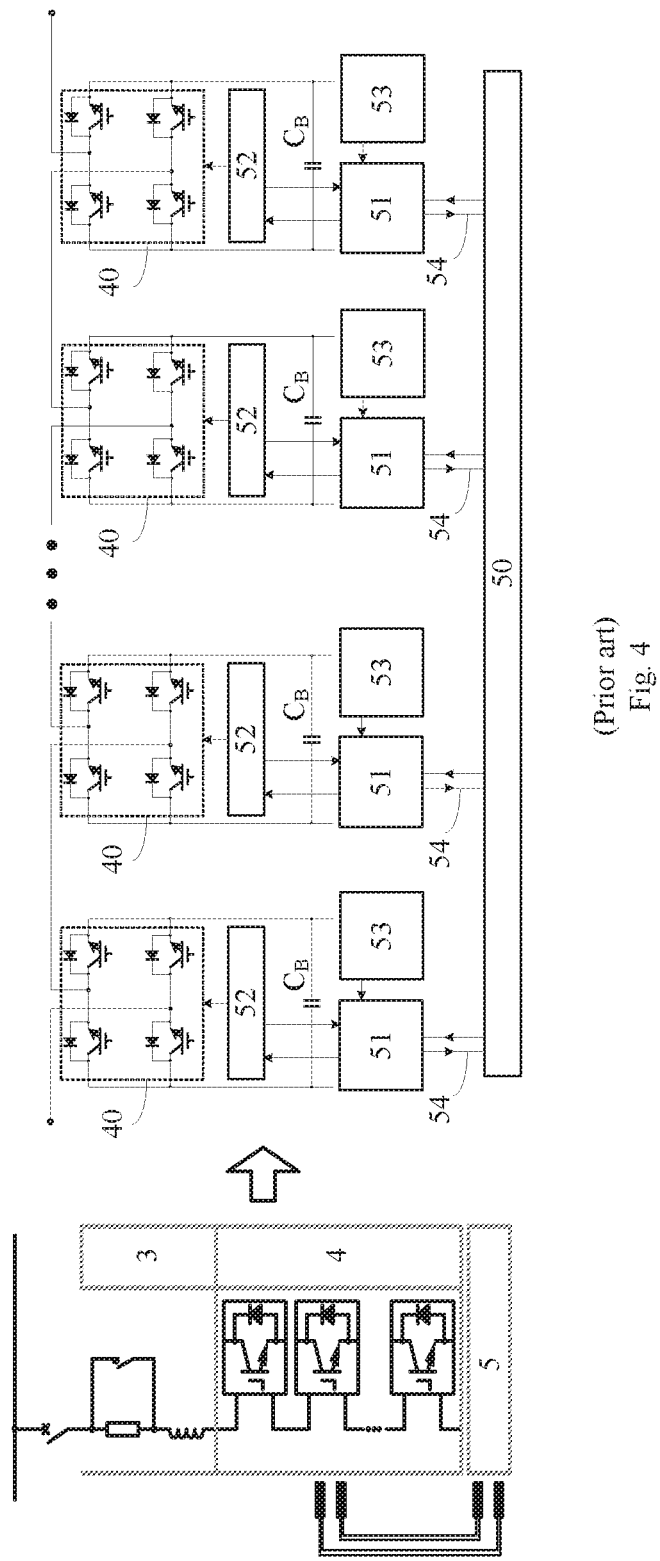
FIG. 4 is a schematic diagram of a single phase SVG in the prior art.
Figure 5:
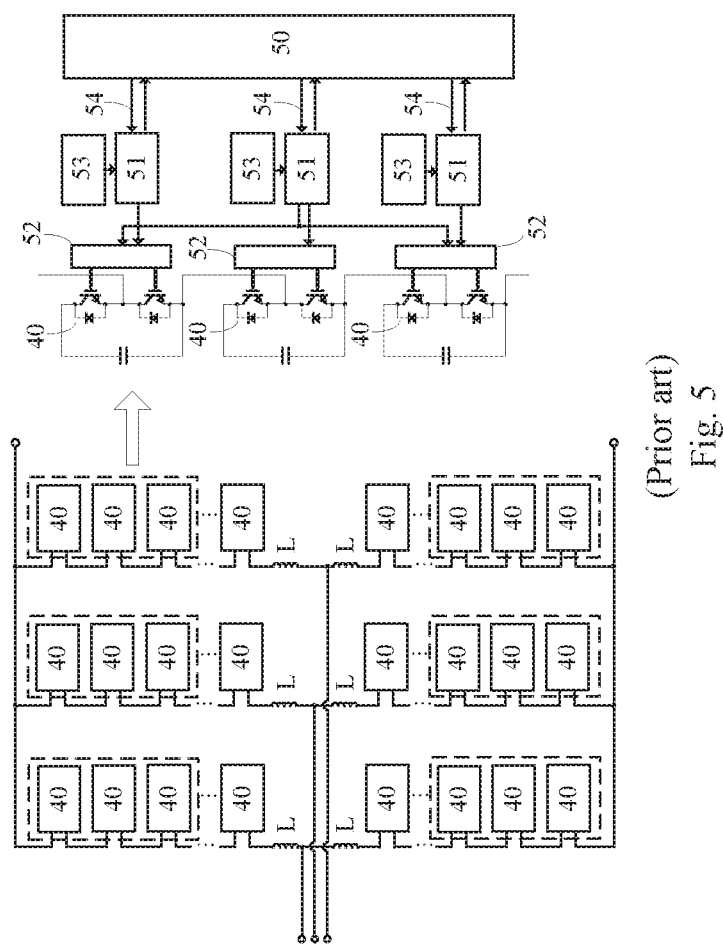
FIG. 5 is a schematic diagram of an HVDC-Light system in the prior art.

Example embodiments will now be described more fully with reference to the accompanying drawings. However, the example embodiments can be embodied in a variety of forms and should not be construed as being limited to the examples set forth herein; rather, these embodiments are provided to make the present disclosure more comprehensive and complete, and fully convey the concept of the example embodiments to those skilled in the art. The drawings are only schematic representations of the disclosure and are not necessarily drawn to scale. The same reference numerals in the drawings denote the same or similar parts, and the repeated description thereof will be omitted.

Furthermore, the described features, structures or characteristics may be combined in any suitable manner in one or more embodiments. In the following description, numerous specific details are provided to give full understanding of embodiments of the present disclosure. However, one skilled in the art will appreciate that the technical solution of the present disclosure may be practiced while one or more of the specific details may be omitted, or while other methods, components, devices, steps, and the like may be employed.

In other instances, well-known structures, methods, devices, implementations, or operations are not shown or described in detail to avoid obscuring aspects of the present disclosure.

Figure 6:
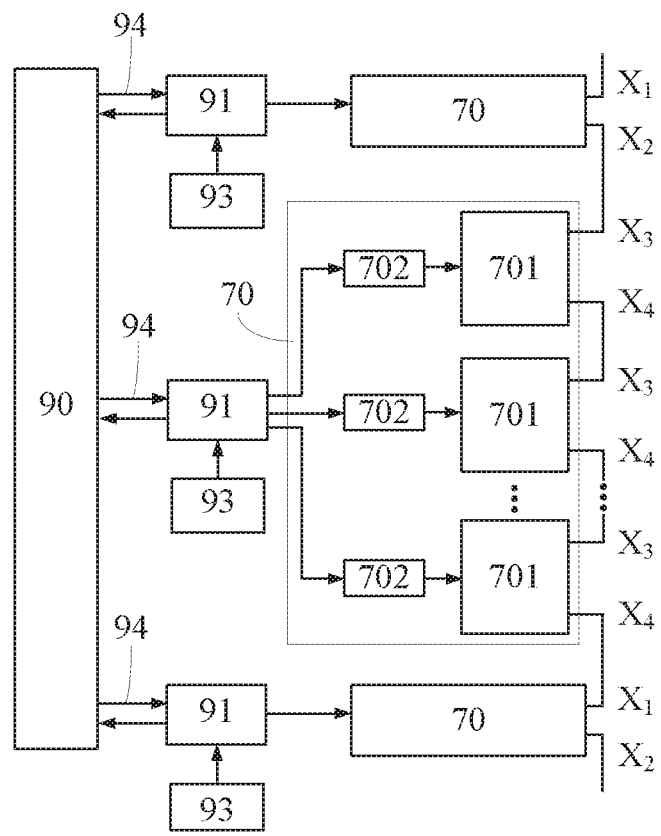
FIG. 6 is a block diagram of a modular power supply system in accordance with one embodiment of the present disclosure.

FIG. 6 is a block diagram of a modular power supply system in accordance with one embodiment of the present disclosure. As shown in FIG. 6, a power electronic converter of the present disclosure is configured to include: a main controller 90, N local controllers 91. N auxiliary power supplies 93, and N power units 70, wherein N is a natural number greater than one.

The main controller 90 is configured to output a main control signal. The main control signal is, for example, one or more parameters set to control the overall operational state of the modular power supply system.

Each local controller 91 is configured to receive the aforementioned main control signal to output at least one local control signal. The local control signal is, for example, one or more parameters set to control the overall operational state of the corresponding power unit 70, or the local control signal is set to control the operational state of a portion of the power converters in the corresponding power unit 70.

The N auxiliary power supplies 93 are in one-to-one correspondence with the N local controllers 91. Each auxiliary power supply 93 is configured to provide power supply for the corresponding local controller 91.

The N power units 70 are in one-to-one correspondence with the N local controllers 91. Each power unit 70 includes a first end $X_1$ and a second end $X_2$. The second end $X_2$ of each power unit 70 is connected to the first end $X_1$ of an adjacent power unit 70. That is, the second end $X_2$ of one of the adjacent two power units 70 is connected to the first end $X_1$ of the other one of the adjacent two power units 70.

Each power unit 70 is configured to include M power converters 701, wherein each power converter 701 includes a third end $X_3$ and a fourth end $X_4$. The fourth end $X_4$ of each power converter is connected to the third end $X_3$ of an adjacent power converter 701. That is, the fourth end $X_4$ of one of the adjacent two power converters 701 is connected to the third end $X_3$ of the other one of the adjacent two power converters 701. M is a natural number greater than one. Thus, the third end $X_3$ of the first power converter 701 is connected to the first end $X_1$ of the power unit 70, and the fourth end $X_4$ of the M-th power converter 701 is connected to the second end $X_2$ of the power unit 70. Each power converter 701 is configured to operate in accordance with a local control signal output by the corresponding local controller 91.

As an embodiment of the present disclosure, the aforementioned main control signal may be transmitted between the main controller 90 and each of the local controllers 91 via an optical isolation device, such as an optical fiber 94. In other embodiments, the main controller 90 and each local controller 91 can be connected by a magnetic isolation device, such as an isolation transformer. The connection manner between the main controller 90 and each local controller 91 is not limited to the above connection manner.

The power electronic device of the present disclosure can be applied to fields such as SVG, MVD, HVDC-Light and wind power generation systems.

As shown in FIG. 6, the present disclosure proposes to combine M power converters 701 into one power unit 70. One power unit 70 is provided with a set of local controller 91, optical fiber 94 and auxiliary power supply 93. That is, only one set of local controller 91, optical fiber 94 and auxiliary power supply 93 controls the M power converters 701. However, in the conventional solution, each power unit 40, that is, each power converter, needs to be configured with a set of local controller 51, optical fiber 54 and auxiliary power supply 53. Compared with the conventional solution, the number of local controllers 91, optical fibers 94 and auxiliary power supplies 93 required for the modular power supply system proposed by the present disclosure will be reduced to 1/M of the conventional solution. The present disclosure greatly simplifies the structural design of the modular power supply system, the cost is significantly reduced, and the reliability is greatly improved as well.

Figure 7:
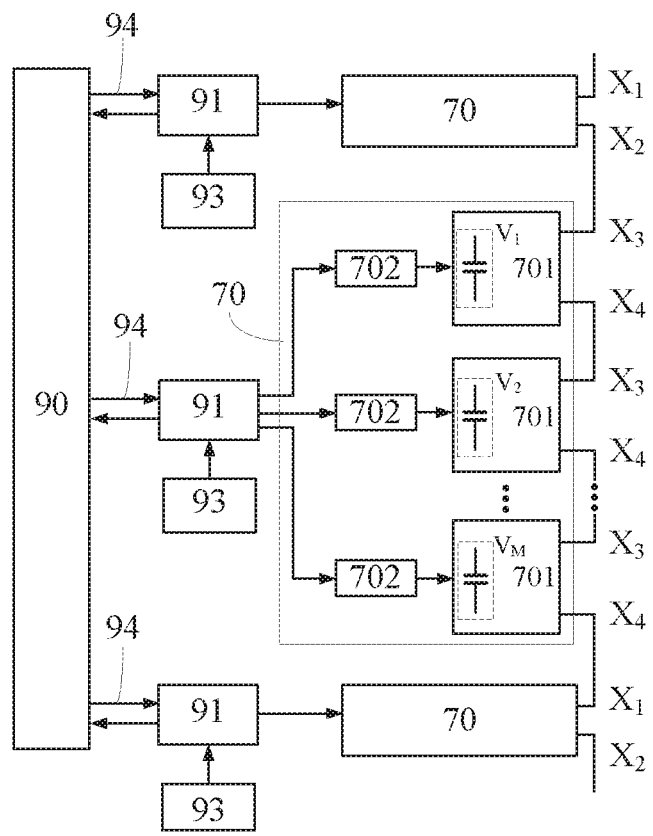
FIG. 7 is a block diagram of a modular power supply system in accordance with another embodiment of the present disclosure.

The present disclosure does not limit the DC bus voltage of each power converter 701. The DC bus voltages of the M power converters 701 in the modular power supply system of the present disclosure may be all identical, partially identical, or all different from each other. Based on FIG. 6, FIG. 7 is a block diagram of a modular power supply system in accordance with another embodiment of the present disclosure. As shown in FIG. 7, the DC bus voltages of the M power converters 701 in the power unit 70 may be $V_1$, $V_2$, ..., and $V_M$, respectively, where $V_1$, $V_2$, ... and $V_M$ may be all the same, i.e., $V_1=V_2=\ldots=V_M$, or may be partially the same $V_1=V_2$, $V_1\neq V_M$, or all different from each other, i.e., $V_1\neq V_2\neq\ldots\neq V_M$.

The present disclosure does not limit the topology used in each power converter 701 either. The M power converters 701 in the modular power supply system of the present disclosure may be any one kind of AC/DC converters, DC/AC converters and DC/DC converters. A power converter 701 in FIG. 7 represents any one kind of the applicable AC/DC, DC/AC and DC/DC topologies. The feature that the present disclosure does not limit the topology used in the M power converters 701 further lies in that the topology of the M power converters may be all identical, or partially identical. For example, the topology of all of the M power converters 701 in each power unit 70 of the modular power supply system of the present disclosure may be any one kind of full-bridge converters, half-bridge converters, neutral point clamped three-level converters, diode clamping three-level converters, flying capacitor three-level converters, full-bridge resonant converters and half-bridge resonant converters. Alternatively, for example, the topologies of the M power converters 701 in each power unit 70 of the modular power supply system of the present disclosure may be a combination of two or more kinds of full-bridge converters, half-bridge converters, neutral point clamped three-level converters, diode clamping three-level converters, flying capacitor three-level converters, full-bridge resonant converters and half-bridge resonant converters.

Each of the M power converters 701 in each power unit 70 of the modular power supply system of the present disclosure can be configured to include: at least one power semiconductor switch, wherein each of the local control signals is configured to control turn-on and turn-off of the corresponding power semiconductor switch.

As shown in FIG. 6 and FIG. 7, each power unit 70 in the modular power supply system of the present embodiment may include: M drive circuits 702, in one-to-one correspondence with the M power converters 701, wherein each of the drive circuits 702 is configured to be connected to the power semiconductor switch of the corresponding power converter 701, and receive at least one local control signal output by the corresponding local controller 91, and output at least one driving signal according to the at least one local control signal output by the corresponding local controller 91, to control turn-on and turn-off of the power semiconductor switches in the corresponding M power converters 701.

In other embodiments, each power unit in the modular power supply system may include: a plurality of drive circuits, wherein the number of the plurality of drive circuits is equal to the number of the power semiconductor switch in this power unit. Each of the drive circuits is configured to be connected to the corresponding power semiconductor switch, to receive the corresponding local control signal and output a driving signal according to the corresponding local control signal, to control turn-on and turn-off of the corresponding power semiconductor switch.

Figure 8:
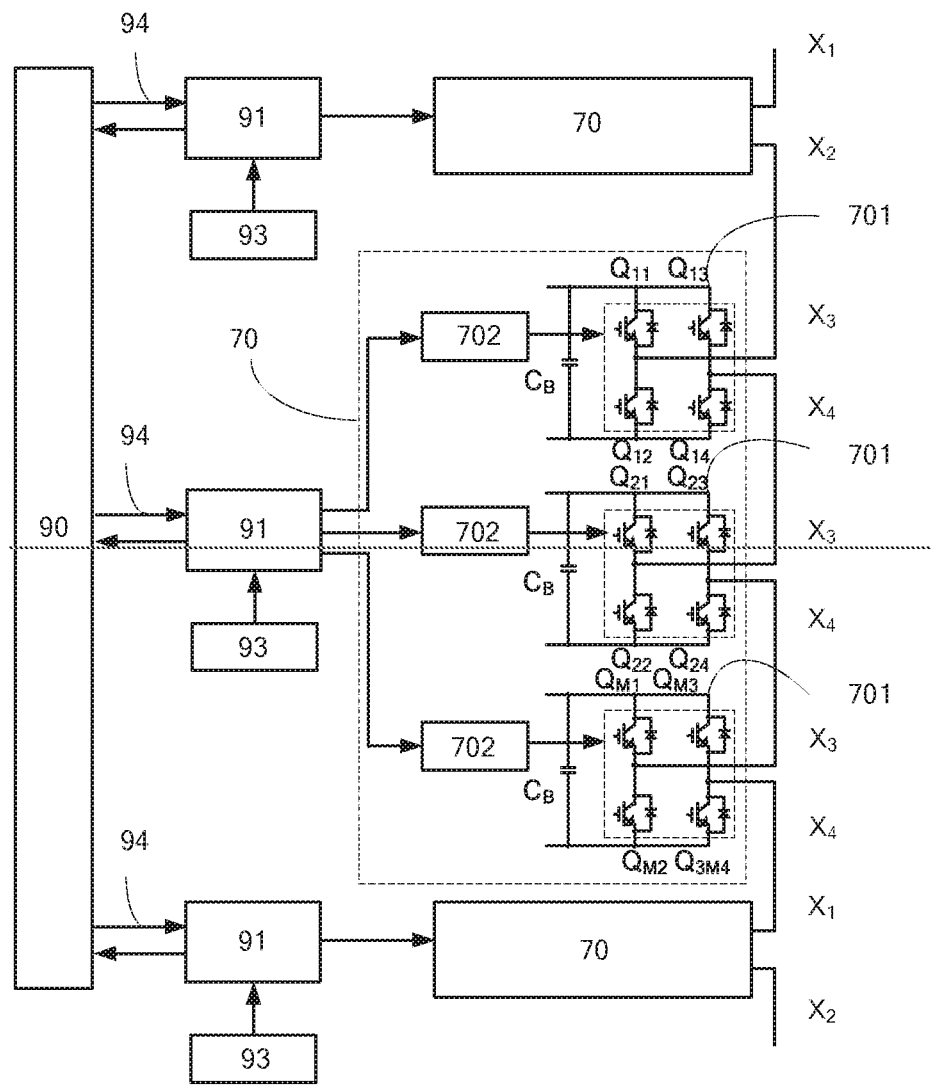
FIG. 8 is a block diagram of a modular power supply system in accordance with another embodiment of the present disclosure.

FIG. 8 is a block diagram of a modular power supply system in accordance with another embodiment of the present disclosure. As shown in FIG. 8, the topologies of all of the M power converters 701 of each power unit 70 in the modular power supply system of the present embodiment employ a full-bridge converter, such as an H-bridge circuit. Each H-bridge circuit 701 includes four power semiconductor switches and a DC bus capacitor. The four power semiconductor switches form two bridge arms. For convenience of explanation, the four power semiconductor switches are respectively defined as an upper power semiconductor switch of one bridge arm, a lower power semiconductor switch of the one bridge arm, an upper power semiconductor switch of the other bridge arm and a lower power semiconductor switch of the said the other bridge arm. In the embodiment, one end of the upper power semiconductor switch of the one bridge arms is connected to one end of the upper power semiconductor switch of the said the other bridge arm and one end of the DC bus capacitor. The other end of the lower power semiconductor switch of the one bridge arm is connected to the other end of the lower power semiconductor switch of the said the other bridge arm and the other end of the DC bus capacitor. The upper power semiconductor switch and the lower power semiconductor switch of the one bridge arm are connected at a third end $X_3$. The upper power semiconductor switch and the lower power semiconductor switch of the said the other bridge arm are connected at the fourth end $X_4$. Taking the M-th power converter 701 as an example, the power converter 701 includes two bridge arms and a DC bus capacitor. One end of the upper power semiconductor switch $Q_{M1}$ of one bridge arm is connected to one end of the upper power semiconductor switch $Q_{M3}$ of the other bridge arm and one end of the DC bus capacitor $C_B$. The other end of the lower power semiconductor switch $Q_{M2}$ of the one bridge arm is connected to the other end of the lower power semiconductor switch $Q_{M4}$ of the said the other bridge arm and the other end of the DC bus capacitor $C_B$. A connection point of the upper power semiconductor switch $Q_{M1}$ and the lower power semiconductor switch $Q_{M2}$ of one bridge arm is the third end $X_3$. A connection point of the upper power semiconductor switch $Q_{M3}$ and the lower power semiconductor switch $Q_{M4}$ of the other bridge arm is the fourth end $X_4$.

In this embodiment, the third end $X_3$ of the first H-bridge circuit 701 in each power unit 70 is connected to the first end $X_1$ of the power unit 70, and the fourth end $X_4$ of the first H-bridge circuit 701 is connected to the third end $X_3$ of the second H-bridge circuits 701, and so on, the fourth end $X_4$ of the (M−1)-th H-bridge circuit 701 is connected to the third end $X_3$ of the M-th H-bridge circuit 701, and the fourth end $X_4$ of the M-th power converter is connected to the second end $X_2$ of the power unit 70.

The local controller 91 corresponding to each power unit 70 outputs at least one local control signal for controlling the turn-on and turn-off of the power semiconductor switches in the corresponding H-bridge circuit 701. In this embodiment, each H-bridge circuit 701 needs four local control signals to respectively control the corresponding power semiconductor switches to be turned on and off. Each power unit 70 needs 4*M local control signals. That is, the local controller needs to output 4*M local control signals, to control the turn-on and turn-off of the corresponding power semiconductor switches. That is, each of the power semiconductor switches $Q_{M1}$-$Q_{M4}$ needs the corresponding local control signal.

As shown in FIG. 8, each power unit 70 further includes M drive circuits 702. The drive circuits 702 are in one-to-one correspondence with M H-bridge circuits 701. Each drive circuit 702 receives the corresponding local control signal and outputs at least one driving signal to respectively control the turn-on and turn-off of the corresponding power semiconductor switches. Specifically, each drive circuit 702 receives the corresponding four local control signals, and outputs four driving signals to respectively drive the turn-on and turn-off of the corresponding power semiconductor switches. Taking the drive circuit 702 corresponding to the first H-bridge circuit 701 as an example, the drive circuit outputs four driving signals to respectively drive the turn-on and turn-off of the power semiconductor switches $Q_{11}$-$Q_{14}$.

In other embodiments, each power unit 70 further includes a plurality of drive circuits. The number of drive circuits is equal to 4*M. Each drive circuit is connected to the corresponding power semiconductor switch, and receives the corresponding local control signal to output a driving signal for controlling the turn-on and turn-off of the corresponding power semiconductor switch. Taking the four drive circuits corresponding to the first H-bridge circuit 701 as an example, the four drive circuits are respectively connected to the power semiconductor switches $Q_{11}$-$Q_{14}$. Each drive circuit outputs a driving signal to control the turn-on and turn-off of the corresponding one of the power semiconductor switches $Q_{M1}$-$Q_{M4}$.

Figure 9:
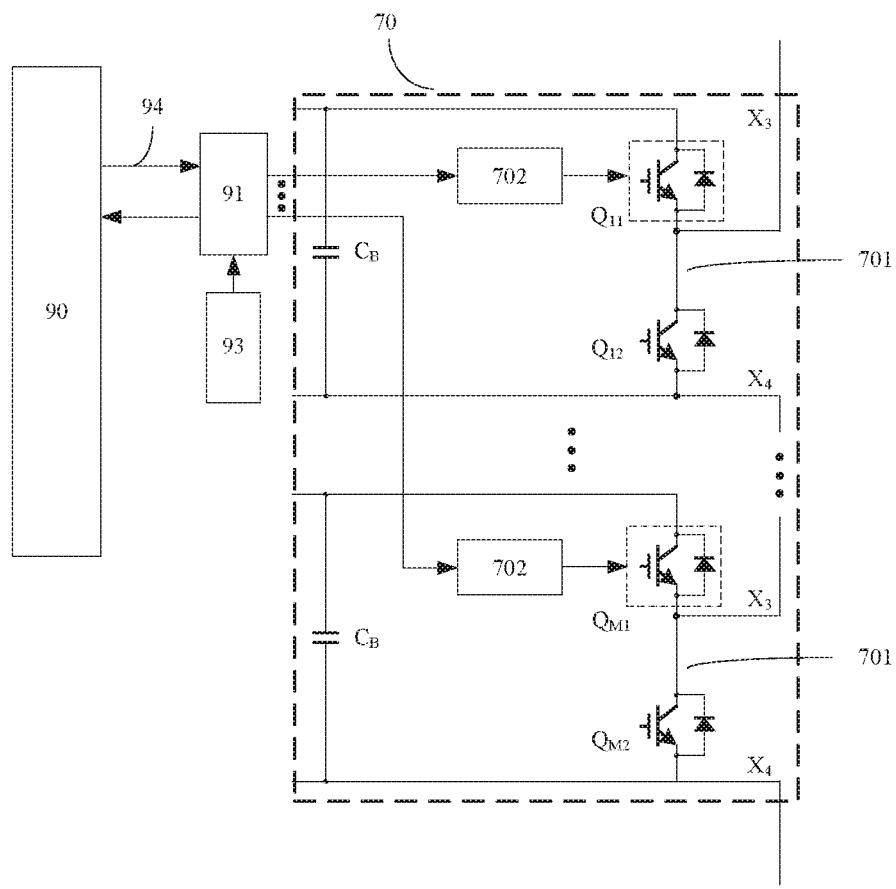
FIG. 9 is a block diagram of a modular power supply system in accordance with another embodiment of the present disclosure.

FIG. 9 is a block diagram of a modular power supply system in accordance with another embodiment of the present disclosure. As shown in FIG. 9, the topologies of all of the M power converters 701 of each power unit 70 in the modular power supply system of the present embodiment employ a half-bridge converter. Each of the half-bridge converters 701 includes two power semiconductor switches and a DC bus capacitor, the connection relationship of which is shown in FIG. 9. One end of one power semiconductor is connected to one end of the DC bus capacitor, the other end of the one power semiconductor is connected to one end of the other power semiconductor switch, and the other end of the said the other power semiconductor switch is connected to the other end of the DC bus capacitor $C_B$. A connection point at which the two power semiconductor switches are connected to each other is the third end $X_3$, and the other end of the said the other power semiconductor switch is the fourth end $X_4$. Taking the first power converter 701 as an example, the power converter 701 includes two power semiconductor switches $Q_{11}$, $Q_{12}$ and a DC bus capacitor $C_B$. One end of the power semiconductor switch $Q_{11}$ is connected to one end of the DC bus capacitor $C_B$, the other end of the power semiconductor switch $Q_{11}$ is connected to one end of the power semiconductor switch $Q_{12}$, and the other end of the power semiconductor switch $Q_{12}$ is connected to the other end of the DC bus capacitor $C_B$. The connection point of the power semiconductor switch $Q_{11}$ and the power semiconductor switch $Q_{12}$ is the third end $X_3$ of the first power converter 701, and the other end of the power semiconductor switch $Q_{11}$ is the fourth end $X_4$ of the first power converter 701.

In this embodiment, the third end $X_3$ of the first half-bridge converter (i.e., the first power converter 701) in each power unit 70 is connected to the first end $X_1$ of the power unit 70, the fourth end $X_4$ of the first half-bridge converter is connected to the third end $X_3$ of the second half-bridge converter, and so on, the fourth end $X_4$ of the (M−1)-th half-bridge converter is connected to the third end $X_3$ of the M-th half-bridge converter, and the four end $X_4$ of the M-th half-bridge converter is connected to the second end $X_2$ of the power unit 70.

In this embodiment, the local controller 91 corresponding to each power unit 70 can output 2*M local control signals, for controlling the turn-on and turn-off of the power semiconductor switches $Q_{11}$-$Q_{M2}$ in the half-bridge converter 701. That is, each of the power semiconductor switches $Q_{11}$-$Q_{M2}$ needs a local control signal.

As shown in FIG. 9, each power unit 70 further includes M drive circuits 702. The drive circuits 702 are in one-to-one correspondence with the M half-bridge converters 701. Each drive circuit 702 receives the corresponding local control signal and outputs at least one driving signal to respectively drive the turn-on and turn-off of the corresponding power semiconductor switches. Specifically, each drive circuit 702 receives two corresponding local control signals, and outputs two driving signals to respectively control the turn-on and turn-off of the corresponding power semiconductor switches. Taking the drive circuit 702 corresponding to the first half-bridge converter 701 as an example, the drive circuit outputs two driving signals for controlling the turn-on and turn-off of the power semiconductor switches $Q_{11}$-$Q_{12}$ respectively.

In other embodiments, each power unit 70 further includes a plurality of drive circuits. The number of the drive circuits is equal to 2*M. Each drive circuit is connected to the corresponding one of the power semiconductor switches, and receives the corresponding local control signal to output a driving signal to drive the turn-on and turn-off of the corresponding power semiconductor switch. Taking the two drive circuits corresponding to the first half-bridge converter 701 as an example, the two drive circuits are respectively connected to the power semiconductor switches $Q_{11}$-$Q_2$, and each drive circuit outputs a driving signal to control the turn-on and turn-off of the corresponding one of the power semiconductor switches $Q_{11}$-$Q_{12}$.

Figure 10:
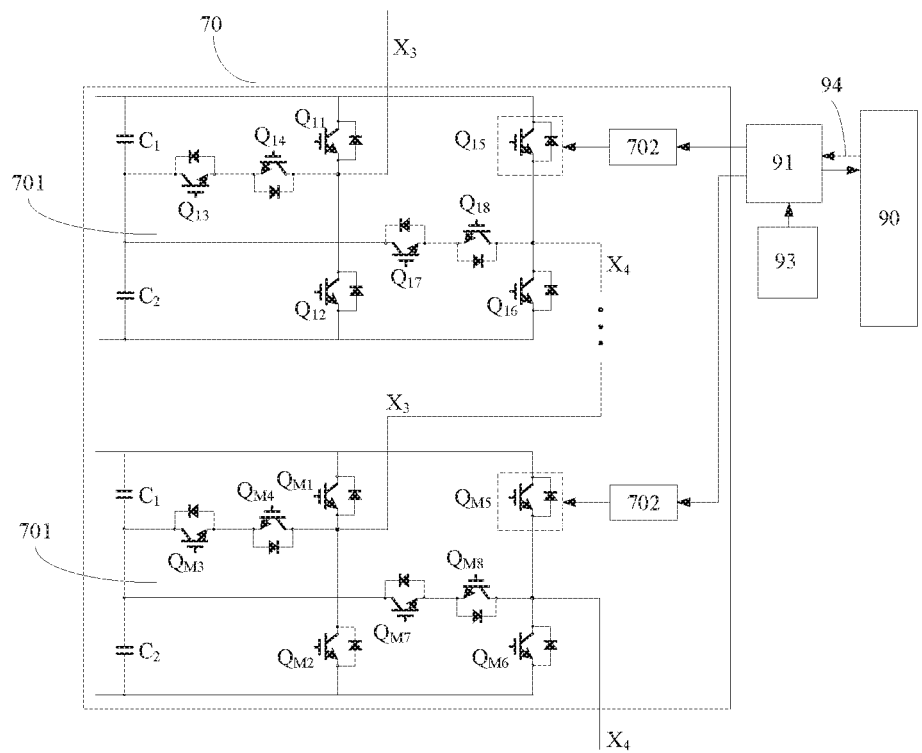
FIG. 10 is a block diagram of a modular power supply system in accordance with another embodiment of the present disclosure.

FIG. 10 is a block diagram of a modular power supply system in accordance with another embodiment of the present disclosure. As shown in FIG. 10, the topologies of all of the M power converters 701 of each power unit 70 in the modular power supply system of the present embodiment employ a neutral point clamped three-level converter. Each of the neutral point clamped three-level converters 701 includes eight power semiconductor switches and two DC bus capacitors, the connection relationship of which is shown in FIG. 10. Taking the first power converter 701 as an example, one end of the power semiconductor switch $Q_{11}$ is connected to one end of the DC bus capacitor $C_1$ and one end of the power semiconductor switch $Q_{15}$, the other end of the DC bus capacitor $C_1$ is connected to one end of the DC bus capacitor $C_2$, and the other end of the power semiconductor switch $Q_{11}$ is connected to one end of the power semiconductor switch $Q_{12}$. A connection point of the power semiconductor switch $Q_{11}$ and the power semiconductor switch $Q_2$ is the third end $X_3$ of the first power converter 701. The other end of the power semiconductor switch $Q_{15}$ is connected to one end of the power semiconductor switch $Q_{16}$. The other end of the power semiconductor switch $Q_{12}$ is connected to the other end of the DC bus capacitor $C_2$ and the other end of the power semiconductor switch $Q_{16}$. A connection point of the power semiconductor switch $Q_{15}$ and the power semiconductor switch $Q_{16}$ is the fourth end $X_4$ of the first power converter 701. One end of the power semiconductor switch $Q_{13}$ is connected to the said the other end of the DC bus capacitor $C_1$, the other end of the power semiconductor switch $Q_{13}$ is connected to one end of the power semiconductor switch $Q_{14}$, and the other end of the power semiconductor switch $Q_{14}$ is connected to the said the other end of the power semiconductor switch $Q_{11}$. One end of the power semiconductor switch $Q_{17}$ is connected to the said the other end of the DC bus capacitor $C_1$, the other end of the power semiconductor switch $Q_{17}$ is connected to one end of the power semiconductor switch $Q_{18}$, and the other end of the power semiconductor switch $Q_{18}$ is connected to the said the other end of the power semiconductor switch $Q_{15}$.

In this embodiment, the third end $X_3$ of the first neutral point clamped three-level converter in each power unit 70 is connected to the first end $X_1$ of the power unit 70, the fourth end $X_4$ of the first neutral point clamped three-level converter is connected to the third end $X_3$ of the second neutral point clamped three-level converter, and so on, the fourth end $X_4$ of the (M−1)-th neutral point clamped three-level converter is connected to the third end $X_3$ of the M-th neutral point clamped three-level converter, and the fourth end $X_4$ of the M-th neutral point clamped three-level converter is connected to the second end $X_2$ of the power unit 70.

In this embodiment, the local controller 91 corresponding to each power unit can output 8*M local control signals, for controlling the turn-on and turn-off of the power semiconductor switches $Q_{11}$-$Q_{M8}$ in the neutral point clamped three-level converter 701. That is, each of the power semiconductor switches $Q_{11}$-$Q_{M8}$ needs a local control signal.

As shown in FIG. 10, each power unit 70 further includes M drive circuits 702. The drive circuits 702 are in one-to-one correspondence with the M neutral point clamped three-level converters 701. Each drive circuit 702 receives the corresponding local control signal and outputs at least one driving signal to respectively control the turn-on and turn-off of the corresponding power semiconductor switches. Specifically, each drive circuit 702 receives the corresponding eight local control signals, and outputs eight driving signals to respectively control the turn-on and turn-off of the corresponding power semiconductor switches. Taking the drive circuit 702 corresponding to the first neutral point clamped three-level converter 701 as an example, the drive circuit outputs eight driving signals for controlling the turn-on and turn-off of the power semiconductor switches $Q_{11}$-$Q_{18}$ respectively.

In other embodiments, each power unit 70 further includes a plurality of drive circuits. The number of the drive circuits is equal to 8*M. Each drive circuit is connected to the corresponding one of the power semiconductor switches, and receives the corresponding local control signal to output a driving signal to control the turn-on and turn-off of the corresponding power semiconductor switch. Taking the eight drive circuits corresponding to the first neutral point clamped three-level converter 701 as an example, the eight drive circuits are respectively connected to the power semiconductor switches $Q_{11}$-$Q_{18}$ and each drive circuit outputs a driving signal to control the turn-on and turn-off of the corresponding one of the power semiconductor switches $Q_{11}$-$Q_{18}$.

Figure 11:
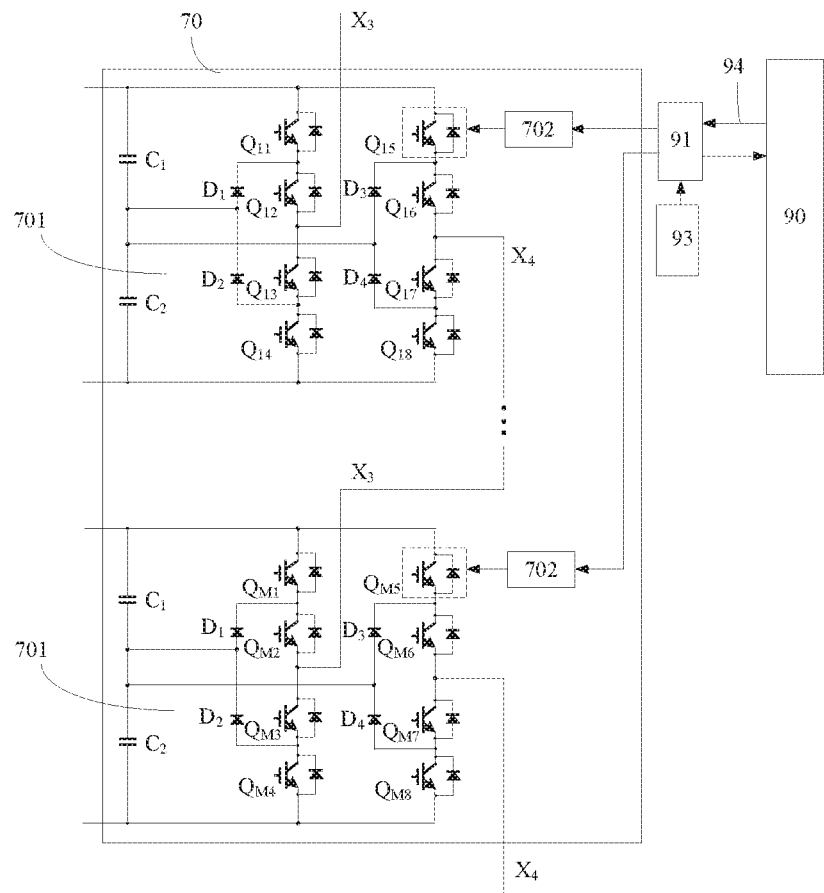
FIG. 11 is a block diagram of a modular power supply system in accordance with another embodiment of the present disclosure.

FIG. 11 is a block diagram of a modular power supply system in accordance with another embodiment of the present disclosure. As shown in FIG. 11, the topologies of all of the M power converters 701 of each power unit 70 in the modular power supply system of the present embodiment employ a diode clamping three-level converters. Each of the diode clamping three-level converters 701 includes eight power semiconductor switches, four clamping diodes and two DC bus capacitors, the connection relationship of which is shown in FIG. 11. Taking the first power converter 701 as an example, one end of the power semiconductor switch $Q_{11}$ is connected to one end of the DC bus capacitor $C_1$ and one end of the power semiconductor switch $Q_{15}$, the other end of the power semiconductor switch Qu is connected to one end of the power semiconductor switch $Q_{12}$ and a cathode of the clamping diode $D_1$, the other end of the power semiconductor switch $Q_{12}$ is connected to one end of the power semiconductor switch $Q_{13}$, the other end of the power semiconductor switch $Q_{13}$ is connected to one end of the power semiconductor switch $Q_{14}$ and an anode of the clamping diode $D_2$, the other end of the DC bus capacitor $C_1$ is connected to one end of the DC bus capacitor $C_2$, the other end of the power semiconductor switch $Q_{14}$ is connected to the other end of the DC bus capacitor $C_2$, and an anode of the clamping diode $D_1$ is connected to a cathode of the clamping diode $D_2$ and the said the other end of the DC bus capacitor $C_1$. A connection point of the power semiconductor switch $Q_{12}$ and the power semiconductor switch $Q_{13}$ is the third end $X_3$ of the first power converter 701. The other end of the power semiconductor switch Qis is connected to one end of the power semiconductor switch $Q_{16}$ and a cathode of the clamping diode $D_3$, the other end of the power semiconductor switch $Q_{16}$ is connected to one end of the power semiconductor switch $Q_{17}$. The other end of the semiconductor switch $Q_{17}$ is connected to one end of the power semiconductor switch $Q_{18}$ and an anode of the clamping diode D4, the other end of the power semiconductor switch $Q_{18}$ is connected to the said the other end of the DC bus capacitor $C_2$, and an anode of the clamping diode $D_3$ is connected to a cathode of the clamping diode $D_4$ and the said the other end of the DC bus capacitor $C_1$. A connection point of the power semiconductor switch $Q_{16}$ and the power semiconductor switch $Q_{17}$ is the fourth end $X_4$ of the first power converter 701.

In this embodiment, the third end $X_3$ of the first diode clamping three-level converter in each power unit 70 is connected to the first end $X_1$ of the power unit 70, the fourth end $X_4$ of first diode clamping three-level converter is connected to the third end $X_3$ of the second diode clamping three-level converter, and so on, the fourth end $X_4$ of the (M−1)-th diode clamping three-level converter is connected to the third end $X_3$ of the M-th diode clamping three-level converter, and the fourth end $X_4$ of the M-th diode clamping three-level converter is connected to the second end $X_2$ of the power unit 70.

In this embodiment, the local controller 91 corresponding to each power unit can output 8*M local control signals, for controlling the turn-on and turn-off of the power semiconductor switches $Q_{11}$-$Q_{M18}$ in the diode clamping three-level converter 701. That is, each of the power semiconductor switches $Q_{11}$-$Q_{M8}$ needs a local control signal.

As shown in FIG. 11, each power unit 70 further includes M drive circuits 702. The drive circuits 702 are in one-to-one correspondence with the M diode clamping three-level converters 701. Each drive circuit 702 receives the corresponding local control signal and outputs at least one driving signal to respectively control the turn-on and turn-off of the corresponding power semiconductor switches. Specifically, each drive circuit 702 receives the corresponding eight local control signals, and outputs eight driving signals to respectively control the turn-on and turn-off of the corresponding power semiconductor switches. Taking the drive circuit 702 corresponding to the first diode clamping three-level converter 701 as an example, the drive circuit outputs eight driving signals for controlling the turn-on and turn-off of the power semiconductor switches $Q_{11}$-$Q_{18}$ respectively.

In other embodiments, each power unit 70 further includes a plurality of drive circuits. The number of the drive circuits is equal to 8*M. Each drive circuit is connected to the corresponding one of the power semiconductor switches, and receives the corresponding local control signal for outputting a driving signal to control the turn-on and turn-off of the corresponding power semiconductor switch. Taking the eight drive circuits corresponding to the first diode clamping three-level converter 701 as an example, the eight drive circuits are respectively connected to the power semiconductor switches $Q_{11}$-$Q_{18}$ and each drive circuit outputs a controlling signal to drive the turn-on and turn-off of the corresponding one of the power semiconductor switches $Q_{11}$-$Q_{18}$.

Figure 12:
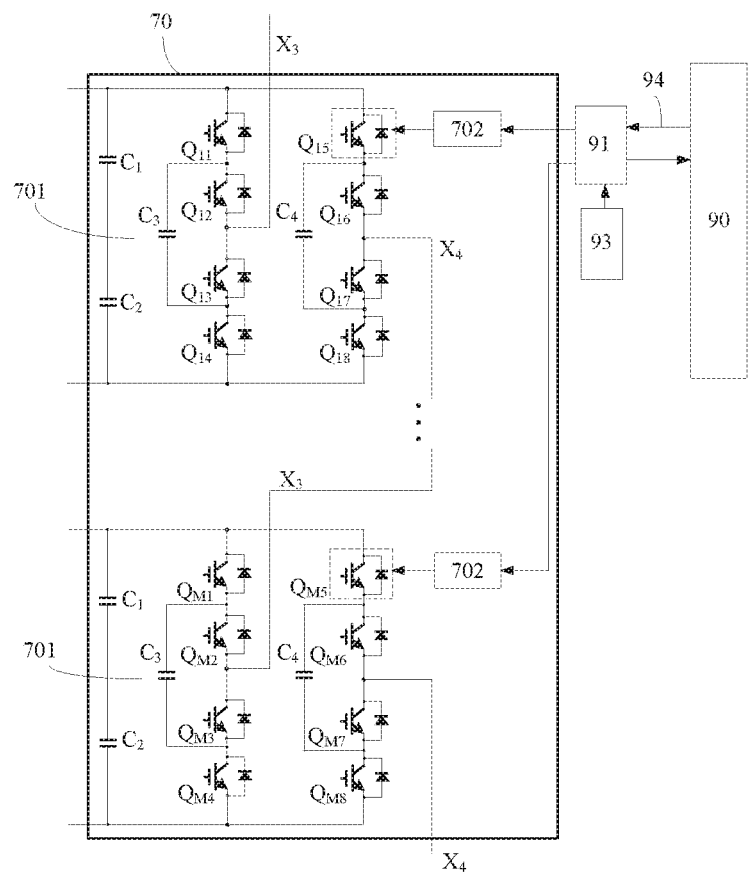
FIG. 12 is a block diagram of a modular power supply system in accordance with another embodiment of the present disclosure.

FIG. 12 is a block diagram of a modular power supply system in accordance with another embodiment of the present disclosure. As shown in FIG. 12, the topologies of all of the M power converters 701 of each power unit 70 in the modular power supply system of the present embodiment employ a flying capacitor three-level converter. Each of the flying capacitor three-level converters 701 includes eight power semiconductor switches, two DC bus capacitors and two flying capacitors, the connection relationship of which is shown in FIG. 12. Taking the first power converter 701 as an example, one end of the power semiconductor switch $Q_{11}$ is connected to one end of the DC bus capacitor $C_1$ and one end of the power semiconductor switch $Q_{15}$, the other end of the power semiconductor switch $Q_{11}$ is connected to one end of the power semiconductor switch $Q_{12}$ and one end of the flying capacitor $C_3$, the other end of the power semiconductor switch $Q_{12}$ is connected to one end of the power semiconductor switch $Q_3$, the other end of the power semiconductor switch $Q_3$ is connected to one end of the power semiconductor switch $Q_{14}$ and the other end of the flying capacitor $C_3$, the other end of the DC bus capacitor $C_1$ is connected to one end of the of DC bus capacitor $C_2$, and the other end of the power semiconductor switch $Q_{14}$ is connected to the other end of the DC bus capacitor $C_2$. A connection point of the power semiconductor switch $Q_{12}$ and the power semiconductor switch $Q_3$ is the third end $X_3$ of the first power converter 701. The other end of the power semiconductor switch $Q_{15}$ is connected to one end of the power semiconductor switch $Q_{16}$ and one end of the flying capacitor $C_4$, the other end of the power semiconductor switch $Q_{16}$ is connected to one end of the power semiconductor switch $Q_{17}$, the other end of the power semiconductor switch $Q_{17}$ is connected to one end of the power semiconductor switch $Q_{18}$ and the other end of the flying capacitor $C_4$, and the other end of the power semiconductor switch $Q_{18}$ is connected to the said the other end of the DC bus capacitor $C_2$. A connection point of the power semiconductor switches $Q_{16}$ and the power semiconductor switch $Q_{17}$ is a fourth end $X_4$ of the first power converter 701.

In this embodiment, the third end $X_3$ of the first flying capacitor three-level converter in each power unit 70 is connected to the first end $X_1$ of the power unit 70, the fourth end $X_4$ of first flying capacitor three-level converter is connected to the third end $X_3$ of the second flying capacitor three-level converter, and so on, the fourth end $X_4$ of the (M−1)-th flying capacitor three-level converter is connected to the third end $X_3$ of the M-th flying capacitor three-level converter, and the fourth end $X_4$ of the M-th flying capacitor three-level converter is connected to the second end $X_2$ of the power unit 70.

In this embodiment, the local controller 91 corresponding to each power unit can output 8*M local control signals, for controlling the turn-on and turn-off of the power semiconductor switches $Q_{11}$-$Q_{M8}$ in the flying capacitor three-level converter 701. That is, each of the power semiconductor switches $Q_{11}$-$Q_{M8}$ needs a local control signal.

As shown in FIG. 12, each power unit 70 further includes M drive circuits 702. The drive circuits 702 are in one-to-one correspondence with the M flying capacitor three-level converters 701. Each drive circuit 702 receives the corresponding local control signal and outputs at least one driving signal to respectively control the turn-on and turn-off of the corresponding power semiconductor switches. Specifically, each drive circuit 702 receives the corresponding eight local control signals, and outputs eight driving signals to respectively control the turn-on and turn-off of the corresponding power semiconductor switches. Taking the drive circuit 702 corresponding to the first flying capacitor three-level converter 701 as an example, the drive circuit outputs eight driving signals for controlling the turn-on and turn-off of the power semiconductor switches $Q_{11}$-$Q_{18}$ respectively.

In other embodiments, each power unit 70 further includes a plurality of drive circuits. The number of the drive circuits is equal to 8*M. Each drive circuit receives the corresponding local control signal and outputs a driving signal to control the turn-on and turn-off of the corresponding power semiconductor switch. Taking the eight drive circuits corresponding to the first flying capacitor three-level converter 701 as an example, the eight drive circuits are respectively connected to the power semiconductor switches $Q_{11}$-$Q_{18}$ and each drive circuit outputs a driving signal to control the turn-on and turn-off of the corresponding one of the power semiconductor switches $Q_{11}$-$Q_{18}$.

The M power converters 701 in the modular power supply system of FIGS. 8-12 may be AC/DC converters or DC/AC converters, but not limited thereto, and may be converters of other topologies as well.

Figure 13:
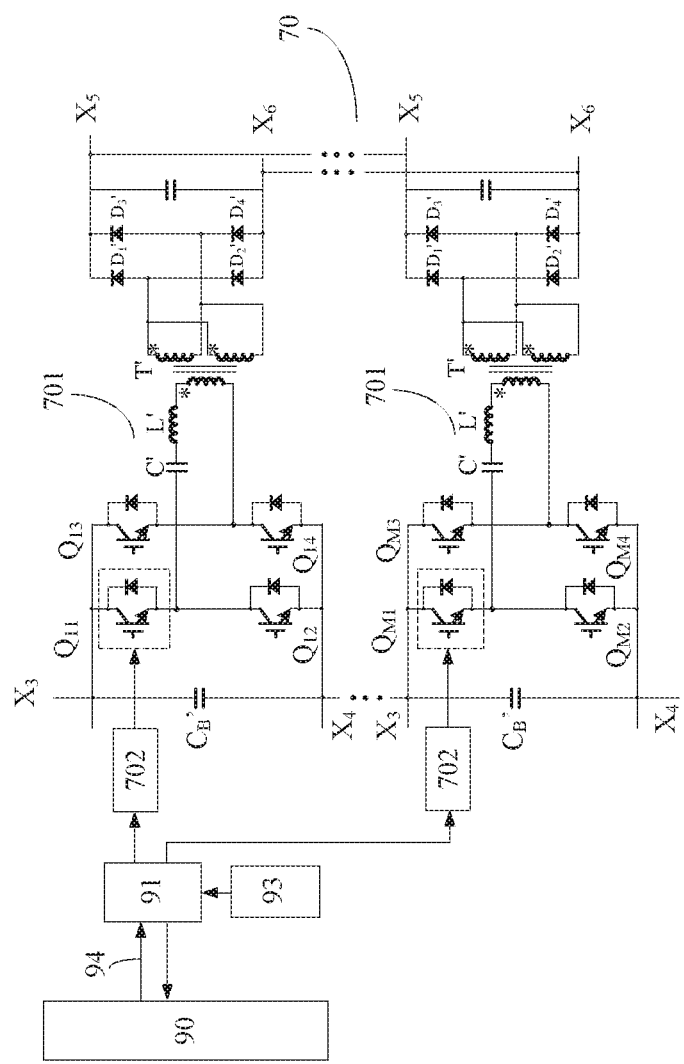
FIG. 13 is a block diagram of a modular power supply system in accordance with another embodiment of the present disclosure.

FIG. 13 is a block diagram of a modular power supply system in accordance with another embodiment of the present disclosure. As shown in FIG. 13, the topologies of all of the M power converters 701 of each power unit 70 in the modular power supply system of the present embodiment employ a full-bridge resonant converter. Each of the full-bridge resonant converters 701 includes a full-bridge circuit, a resonant circuit, a transformer and a rectifier bridge, the connection relationship of which is as shown in FIG. 13. Taking the first full-bridge resonant converter 701 as an example, the full-bridge circuit includes four power semiconductor switches and one DC bus capacitor. One end of the power semiconductor switch $Q_{11}$ is connected to one end of the DC bus capacitor $C_B'$ and one end of the power semiconductor switch $Q_{13}$, the other end of the power semiconductor switch $Q_{11}$ is connected to one end of the power semiconductor switch $Q_{12}$, the other end of the power semiconductor switch $Q_{13}$ is connected to one end of the power semiconductor switch $Q_{14}$, and the other end of the power semiconductor switch $Q_{12}$ is connected to the other end of the DC bus capacitor $C_B'$ and the other end of the power semiconductor switch $Q_{14}$. A connection point of the power semiconductor switch $Q_{11}$ and the power semiconductor switch $Q_{12}$ is connected to one end of a resonant circuit formed by a capacitor $C'$ and an inductor $L'$, and the other end of the resonant circuit is connected to one end of a primary winding of the transformer $T'$, and the other end of the primary winding of the transformer T is connected to the connection point of the power semiconductor switch $Q_{13}$ and the power semiconductor switch $Q_{14}$. The said one end of the DC bus capacitor $C_B'$ is the third end $X_3$ of the first power converter, and the other end of the DC bus capacitor $C_B'$ is the fourth end $X_4$ of the first power converter. The rectifier bridge includes four rectifier diodes, one end of the rectifier diode $D_1'$ is connected to one end of the rectifier diode $D_3'$, the other end of the rectifier diode $D_1'$ is connected to one end of the rectifier diode $D_2'$, the other end of the rectifier diode $D_3'$ is connected to one end of the rectifier diode $D_4'$, and the other end of the rectifier diode $D_2'$ is connected to the other end of the rectifier diode $D_4'$. The said one end of the rectifier diode $D_1'$ is the fifth end $X_5$ of the converter, and the said the other end of the rectifier diode $D_2'$ is the sixth end $X_6$ of the converter. The output end of the transformer $T'$ is respectively connected to the connection point of the rectifier diode $D_1'$ and the rectifier diode $D_2'$ and the connection point of the rectifier diode $D_3'$ and the rectifier diode $D_4'$. The transformer $T'$ may be a center tap transformer having two secondary windings connected in parallel, or the transformer T may have one single secondary winding.

In this embodiment, the third end $X_3$ of the first full-bridge resonant converter in each power unit 70 is connected to the first end $X_1$ of the power unit 70, the fourth end $X_4$ of first full-bridge resonant converter is connected to the third end $X_3$ of the second full-bridge resonant converter, and so on, the fourth end $X_4$ of the (M−1)-th full-bridge resonant converter is connected to the third end $X_3$ of the M-th full-bridge resonant converter, and the fourth end $X_4$ of the M-th full-bridge resonant converter is connected to the second end $X_2$ of the power unit 70. The fifth ends $X_5$ of all of the full-bridge resonant converters in each power unit 70 are connected together, and the sixth ends $X_6$ of all of the full-bridge resonant converters are connected together.

In this embodiment, the local controller 91 corresponding to each power unit can output 4*M local control signals, for controlling the turn-on and turn-off of the power semiconductor switches $Q_{11}$-$Q_{M4}$ in the full-bridge resonant converter 701. That is, each of the power semiconductor switches $Q_{11}$-$Q_{M4}$ needs a local control signal.

As shown in FIG. 13, each power unit 70 further includes M drive circuits 702. The drive circuits 702 are in one-to-one correspondence with the M full-bridge resonant converters 701. Each drive circuit 702 receives the corresponding local control signal and outputs at least one driving signal to respectively control the turn-on and turn-off of the corresponding power semiconductor switches. Specifically, each drive circuit 702 receives the corresponding four local control signals, and outputs four driving signals to respectively control the turn-on and turn-off of the corresponding power semiconductor switches. Taking the drive circuit 702 corresponding to the first full-bridge resonant converter 701 as an example, the drive circuit outputs four driving signals for controlling the turn-on and turn-off of the power semiconductor switches $Q_{11}$-$Q_{14}$ respectively.

In other embodiments, each power unit 70 further includes a plurality of drive circuits. The number of the drive circuits is equal to 4*M. Each drive circuit is connected to the corresponding one of the power semiconductor switches, and receives the corresponding local control signal to output a driving signal to control the turn-on and turn-off of the corresponding power semiconductor switch. Taking the four drive circuits corresponding to the first full-bridge resonant converter 701 as an example, the four drive circuits are respectively connected to the power semiconductor switches $Q_{11}$-$Q_{14}$ and each drive circuit outputs a driving signal to control the turn-on and turn-off of the corresponding one of the power semiconductor switches $Q_{11}$-$Q_{14}$.

Figure 14:
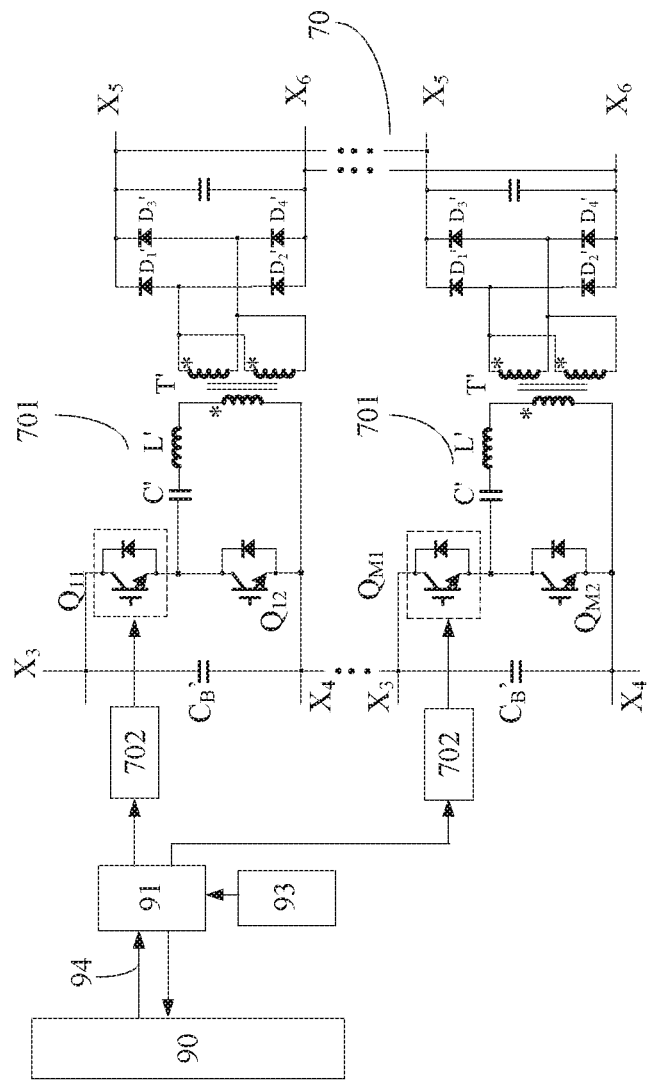
FIG. 14 is a block diagram of a modular power supply system in accordance with another embodiment of the present disclosure.

FIG. 14 is a block diagram of a modular power supply system in accordance with another embodiment of the present disclosure. As shown in FIG. 14, the topologies of all of the M power converters 701 of each power unit 70 in the modular power supply system of the present embodiment employ a half-bridge resonant converter. Each of the half-bridge resonant converters 701 includes a half-bridge circuit, a resonant circuit, a transformer and a rectifier bridge, the connection relationship of which is as shown in FIG. 14. Taking the first half-bridge resonant converter 701 as an example, the half-bridge circuit includes two power semiconductor switches and one DC bus capacitor. One end of the power semiconductor switch $Q_{11}$ is connected to one end of the DC bus capacitor $C_B'$, the other end of the power semiconductor switch $Q_{11}$ is connected to one end of the power semiconductor switch $Q_{12}$, and the other end of the power semiconductor switch $Q_{12}$ is connected to the other end of the DC bus capacitor $C_B'$. A connection point of the power semiconductor switch $Q_{11}$ and the power semiconductor switch $Q_{12}$ is connected to one end of a resonant circuit formed by a capacitor $C'$ and an inductor $L'$, the other end of the resonant circuit is connected to one end of a primary winding of the transformer $T'$, and the other end of the primary winding of the transformer $T'$ is connected to the said the other end of the power semiconductor switch $Q_{12}$. The said one end of the DC bus capacitor $C_B'$ is the third end $X_3$ of the first power converter, and the said the other end of the DC bus capacitor $C_B'$ is the fourth end $X_4$ of the first power converter. The rectifier bridge includes four rectifier diodes, one end of the rectifier diode $D_1'$ is connected to one end of the rectifier diode $D_3'$, the other end of the rectifier diode $D_1'$ is connected to one end of the rectifier diode $D_2'$, the other end of the rectifier diode $D_3'$ is connected to one end of the rectifier diode $D_4'$, and the other end of the rectifier diode $D_2'$ is connected to the other end of the rectifier diode $D_4'$. The said one end of the rectifier diode $D_1'$ is the fifth end $X_5$ of the converter, and the said the other end of the rectifier diode $D_2'$ is the sixth end $X_6$ of the converter. The output end of the transformer T is respectively connected to the connection point of the rectifier diode $D_1'$ and the rectifier diode $D_2'$ and the connection point of the rectifier diode $D_3'$ and the rectifier diode $D_4'$. The transformer T' may be a center tap transformer having two secondary windings connected in parallel, or the transformer T may have one single secondary winding as well.

In this embodiment, the third end $X_3$ of the first half-bridge resonant converter in each power unit 70 is connected to the first end $X_1$ of the power unit 70, the fourth end $X_4$ of first half-bridge resonant converter is connected to the third end $X_3$ of the second half-bridge resonant converter, and so on, the fourth end $X_4$ of the (M−1)-th half-bridge resonant converter is connected to the third end $X_3$ of the M-th half-bridge resonant converter, and the fourth end $X_4$ of the M-th half-bridge resonant converter is connected to the second end $X_2$ of the power unit 70. The fifth ends $X_5$ of all of the half-bridge resonant converters in each power unit 70 are connected together, and the sixth ends $X_6$ of all of the half-bridge resonant converters are connected together.

In this embodiment, the local controller 91 corresponding to each power unit can output 2*M local control signals, for controlling the turn-on and turn-off of the power semiconductor switches $Q_{11}$-$Q_{M2}$ in the half-bridge resonant converter 701. That is, each of the power semiconductor switches $Q_{11}$-$Q_{M2}$ needs a local control signal.

As shown in FIG. 14, each power unit 70 further includes M drive circuits 702. The drive circuits 702 are in one-to-one correspondence with the M half-bridge resonant converters 701. Each drive circuit 702 receives the corresponding local control signal and outputs at least one driving signal to respectively control the turn-on and turn-off of the corresponding power semiconductor switches. Specifically, each drive circuit 702 receives the corresponding two local control signals, and outputs two driving signals to respectively control the turn-on and turn-off of the corresponding power semiconductor switches. Taking the drive circuit 702 corresponding to the first half-bridge resonant converter 701 as an example, the drive circuit outputs two driving signals for controlling the turn-on and turn-off of the power semiconductor switches $Q_{11}$-$Q_{12}$ respectively.

In other embodiments, each power unit 70 further includes a plurality of drive circuits. The number of the drive circuits is equal to 2*M. Each drive circuit is connected to the corresponding one of the power semiconductor switches, and receives the corresponding local control signal and outputs a driving signal to control the turn-on and turn-off of the corresponding power semiconductor switch. Taking the two drive circuits corresponding to the first half-bridge resonant converter 701 as an example, the two drive circuits are respectively connected to the power semiconductor switches $Q_{11}$-$Q_{12}$ and each drive circuit outputs a driving signal to control the turn-on and turn-off of the corresponding one of the power semiconductor switches $Q_{11}$-$Q_{12}$.

The M power converters 701 in the modular power supply system of FIG. 13 and FIG. 14 may be DC/DC converters, but not limited thereto, and may be converters of other topologies as well.

Figure 15:
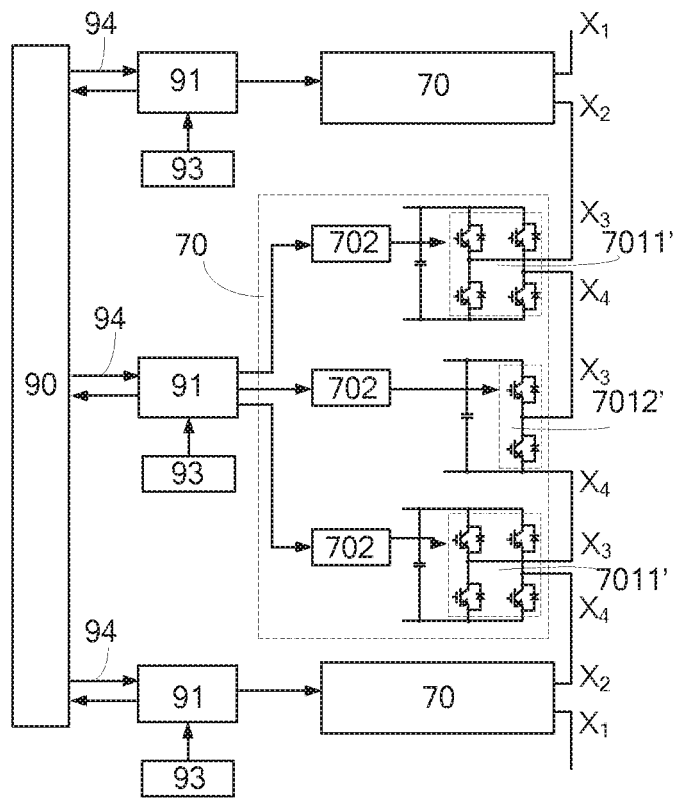
FIG. 15 is a block diagram of a modular power supply system in accordance with another embodiment of the present disclosure.

FIG. 15 is a block diagram of a modular power supply system in accordance with another embodiment of the present disclosure. As shown in FIG. 15, the topologies of the M power converters 701 of each power unit 70 in the modular power supply system of the present embodiment employ a combination of a full-bridge converter and a half-bridge converter. Each power converter 7011' of full-bridge converter includes four power semiconductor switches, each half-bridge converter 7012' includes two power semiconductor switches, and the connection relationship of which is as shown in FIG. 15. In this embodiment, the specific connection relationship of the full-bridge converter is as shown in FIG. 8, and the specific connection relationship of the half-bridge converter is as shown in FIG. 9, details of which are not described herein again. Similarly, the fourth end $X_4$ of one of the adjacent two power converters 701 is connected to the third end $X_3$ of the other one of the adjacent two power converters 701, where M is a natural number greater than one. Thus, the third end $X_3$ of the first power converter 701 is connected to the first end $X_1$ of the power unit 70, the fourth end $X_4$ of the first power converter 701 is connected to the third end $X_3$ of the second power converter 701, and so on, the fourth end $X_4$ of the (M−1)-th power converter 701 is connected to the third end $X_3$ of the M-th power converter 701, and the fourth end $X_4$ of the M-th power converter 701 is connected to the second end $X_2$ of the power unit 70.

In this embodiment, the number of local control signals output by the local controller 91 corresponding to each power unit 70 is equal to the number of power semiconductor switches in the power unit 70. These local control signals respectively control turn-on and turn-off of the power semiconductor switches in the full-bridge converter and the half-bridge converter 701 (i.e. the power converters 7011' and 7012'). That is, each power semiconductor switch needs a local control signal.

As shown in FIG. 15, each power unit 70 further includes M drive circuits 702. The drive circuits 702 are in one-to-one correspondence with the M power converters 7011' and 7012'. Each drive circuit 702 receives the corresponding local control signal and outputs at least one driving signal to respectively control the turn-on and turn-off of the corresponding power semiconductor switches. Specifically, the drive circuit 702 corresponding to the power converters 7011' receives the corresponding four local control signals, and outputs four driving signals to respectively control the turn-on and turn-off of the corresponding power semiconductor switches. The drive circuit 702 corresponding to the power converters 7012' receives the corresponding two local control signals, and outputs two driving signals to respectively control the turn-on and turn-off of the corresponding power semiconductor switches.

In other embodiments, each power unit 70 further includes a plurality of drive circuits. The number of drive circuits in the power unit is equal to the number of power semiconductor switches in the corresponding power unit. Each drive circuit is connected to the corresponding one of the power semiconductor switches, and receives the corresponding local control signal to output a driving signal to control the turn-on and turn-off of the corresponding power semiconductor switch. Taking the four drive circuits corresponding to the power converter 7011' as an example, the four drive circuits are respectively connected to the corresponding power semiconductor switches and each of the drive circuits outputs a driving signal to control the turn-on and turn-off of the corresponding one of the power semiconductor switches. Taking the two drive circuits corresponding to the power converter 7012' as an example, the two drive circuits are respectively connected to the corresponding power semiconductor switches and each of the drive circuits outputs a driving signal to control the turn-on and turn-off of the corresponding one of the power semiconductor switches.

Although FIG. 15 only shows that the topologies of the M power converters 701 of each power unit 70 in the modular power supply system of the present embodiment employ a combination of a full-bridge converter and a half-bridge converter, but the present disclosure is not limited thereto. As described above, the topologies of the M power converters 701 of each power unit 70 in the modular power supply system of the present embodiment may be a combination of two or more kinds of full-bridge converters, half-bridge converters, neutral point clamped three-level converters, diode clamping three-level converters, flying capacitor three-level converters, full-bridge resonant converters and half-bridge resonant converters.

Each of the M power converters 701 in each of the power units 70 of the modular power supply system of the present disclosure may be configured to include: at least one power semiconductor switch, such as the aforementioned power semiconductor switches $Q_{11}$-$Q_{14}$, $Q_{11}$-$Q_{12}$, $Q_{11}$-$Q_{18}$, $Q_{M1}$-$Q_{M4}$, $Q_{M1}$-$Q_{M2}$ or $Q_{M1}$-$Q_{M8}$, wherein each of the aforementioned local control signals is configured to control the turn-on and turn-off of the corresponding power semiconductor switch.

As shown in FIGS. 6-15 above, each of the power units 70 in the modular power system of the present embodiment may include: M drive circuits 702, in one-to-one correspondence with the M power converters 701 (or 7011' or 7012'), wherein each of the drive circuits 702 is configured to be connected to power semiconductor switches in the corresponding power converter 701 (or 7011' or 7012'), to receive local control signals output by the corresponding local controller 91, so as to output at least one driving signal to control turn-on and turn-off of the power semiconductor switches in the corresponding M power converters 701 (or 7011' or 7012').

As shown in FIGS. 6-15, each power unit 70 in the modular power supply system of the present embodiment may include: a plurality of drive circuits 702. The number of drive circuits in the power unit is equal to that of the power semiconductor switches in the power unit. Each of the drive circuits 702 is configured to be connected to a power semiconductor switch of the corresponding power converter 701 and receive a local control signal output by the corresponding local controller 91, to output a driving signal to control turn-on and turn-off of the corresponding power semiconductor switch.

It should be noted that the number of drive circuits included in one power unit in FIG. 6 to FIG. 15 may equal to that of power semiconductor switches in the power unit. Each drive circuit is configured to be connected to the corresponding one of the power semiconductor switches of the power converter. Each drive circuit receives a local control signal output by the corresponding local controller 91, to output a driving signal to control turn-on and turn-off of the corresponding power semiconductor switch.

Each of the drive circuits 702 of the modular power supply system of the present disclosure may be directly electrically connected to the corresponding local controller 91, or connected to the corresponding local controller 91 by a magnetic isolation device or an optical isolation device.

The respective drive circuits 702 in the modular power supply system of the present disclosure may be identical to each other or different from each other.

As shown in FIGS. 6 to 14, the respective drive circuits 702 in the modular power supply system of the present embodiment are identical to each other.

Figure 16:
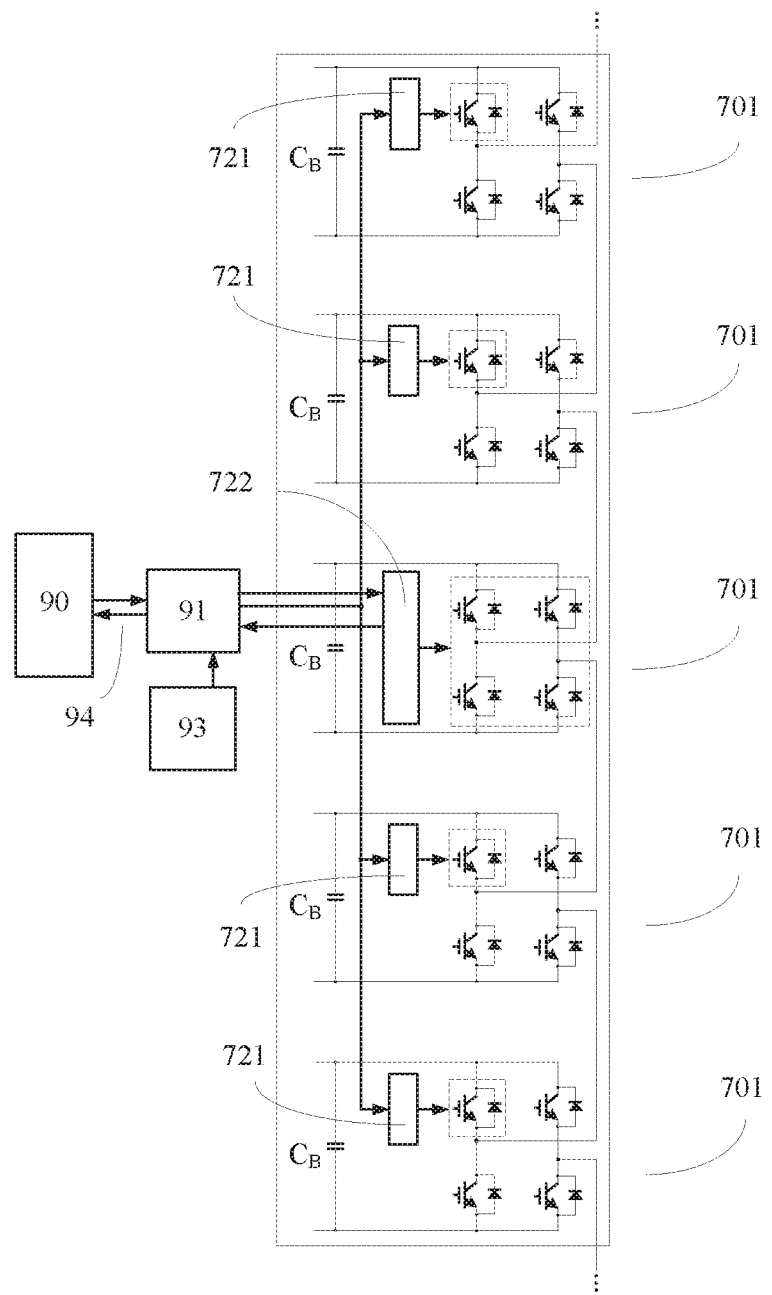
FIG. 16 is a block diagram of a modular power supply system in accordance with another embodiment of the present disclosure.

FIG. 16 is a block diagram of a modular power supply system in accordance with another embodiment of the present disclosure. As shown in FIG. 16, a power unit 701 of the modular power supply system of the present embodiment includes five power converters 701 of H-bridge circuits. The drive circuit 722 of the power converter 701 in the center position is different from the drive circuits 721 of the other four power converters 701.

Figure 17:
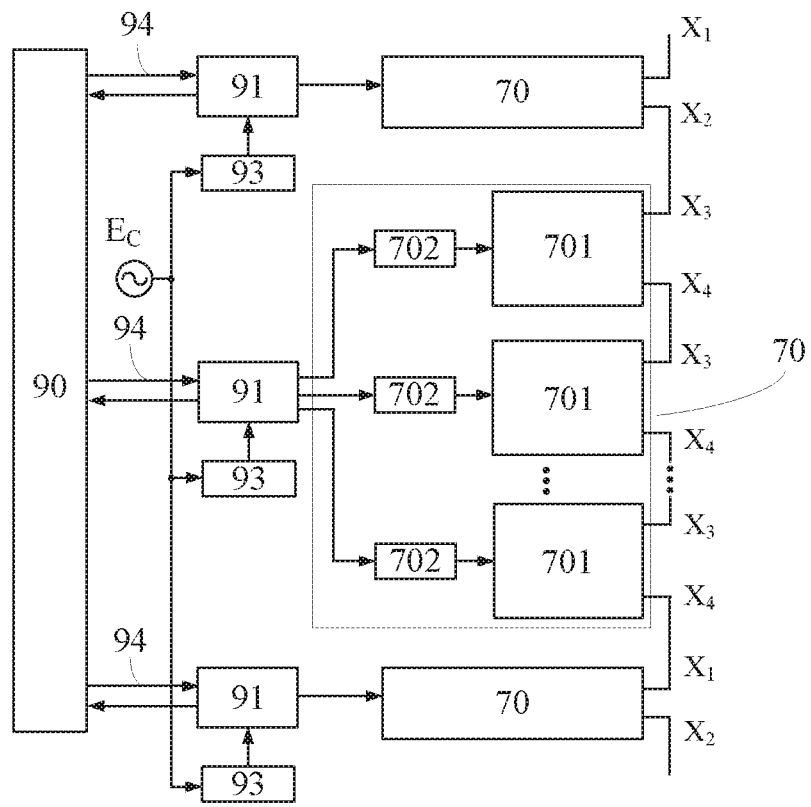
FIG. 17 is a block diagram of a modular power supply system in accordance with another embodiment of the present disclosure.

FIG. 17 is a block diagram of a modular power supply system in accordance with another embodiment of the present disclosure. As shown in FIG. 17, each of the auxiliary power supplies 93 in the modular power supply system of the present embodiment may be configured to get power from an external power supply, such as powering from electric supply or from other circuits. Each of the auxiliary power supplies 93 is connected to the external power supply $E_C$.

Figure 18:
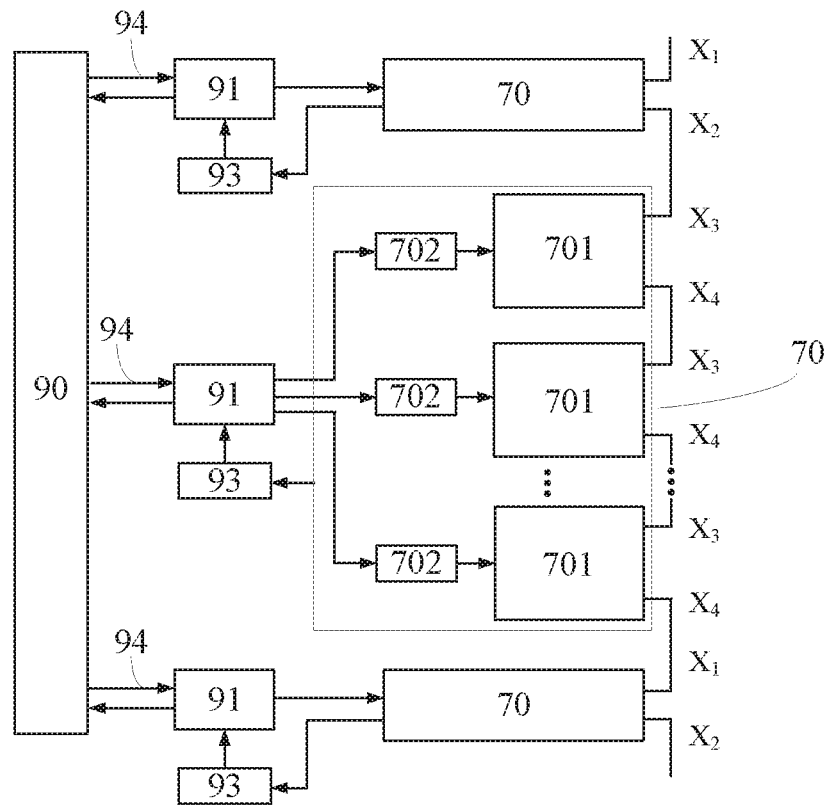
FIG. 18 is a block diagram of a modular power supply system in accordance with another embodiment of the present disclosure.

FIG. 18 is a block diagram of a modular power supply system in accordance with another embodiment of the present disclosure. As shown in FIG. 18, the above N auxiliary power supplies 93 in the modular power system of the present embodiment are in one-to-one correspondence with the above N power units 70. Each of the auxiliary power supplies 93 may be configured to get power from the corresponding power unit 70.

Figure 19:
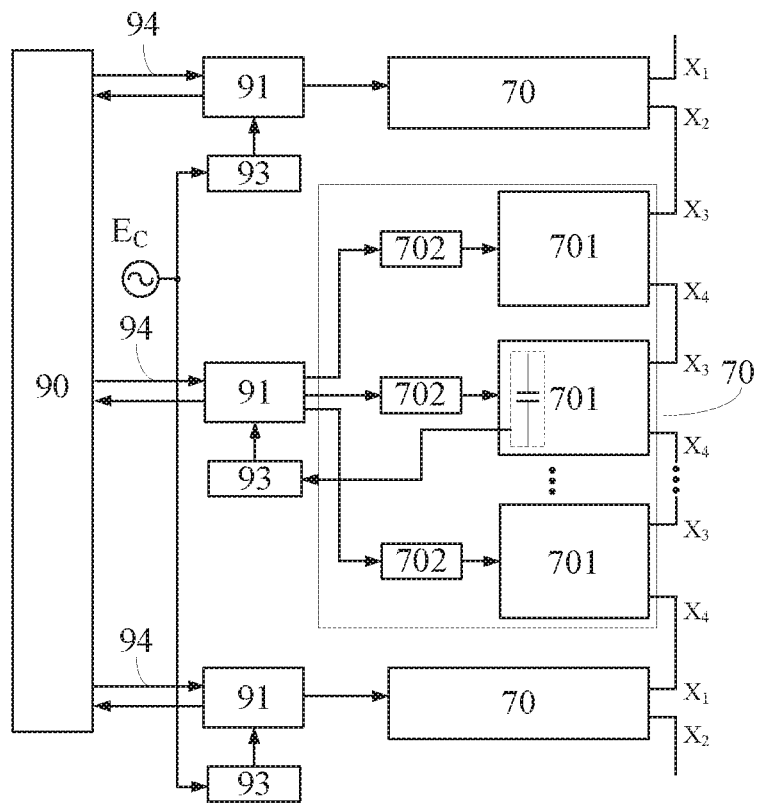
FIG. 19 is a block diagram of a modular power supply system in accordance with another embodiment of the present disclosure.

FIG. 19 is a block diagram of a modular power supply system in accordance with another embodiment of the present disclosure. As shown in FIG. 19, the above N auxiliary power supplies 93 in the modular power system of the present embodiment are in one-to-one correspondence with the above N power units 70. A portion of the auxiliary power supplies 93 in the modular power supply system of the present embodiment may be configured to get power from an external power supply, such as powering from electric power or from other circuits. This portion of the auxiliary power supplies 93 is connected to the external power supply $E_C$. The other portion of the auxiliary power supplies 93 (such as the middle one of FIG. 19) in the modular power supply system of the present embodiment may be configured to get power from the corresponding power unit 70.

Figure 20:
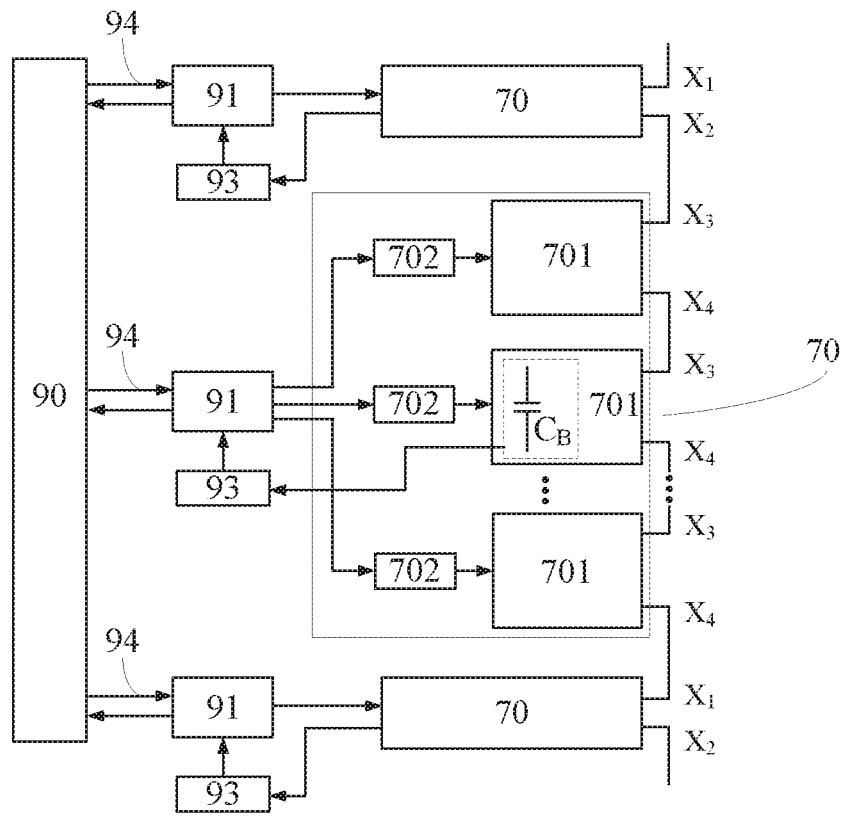
FIG. 20 is a block diagram of a modular power supply system in accordance with another embodiment of the present disclosure.

FIG. 20 is a block diagram of a modular power supply system in accordance with another embodiment of the present disclosure. As shown in FIG. 20, each of the auxiliary power supplies 93 in the modular power supply system of the present embodiment may be configured to get power from a DC bus capacitor $C_B$ of any one of the power converters 701 of the corresponding power unit 70, to acquire a DC bus voltage on the DC bus capacitor $C_B$.

Figure 21:
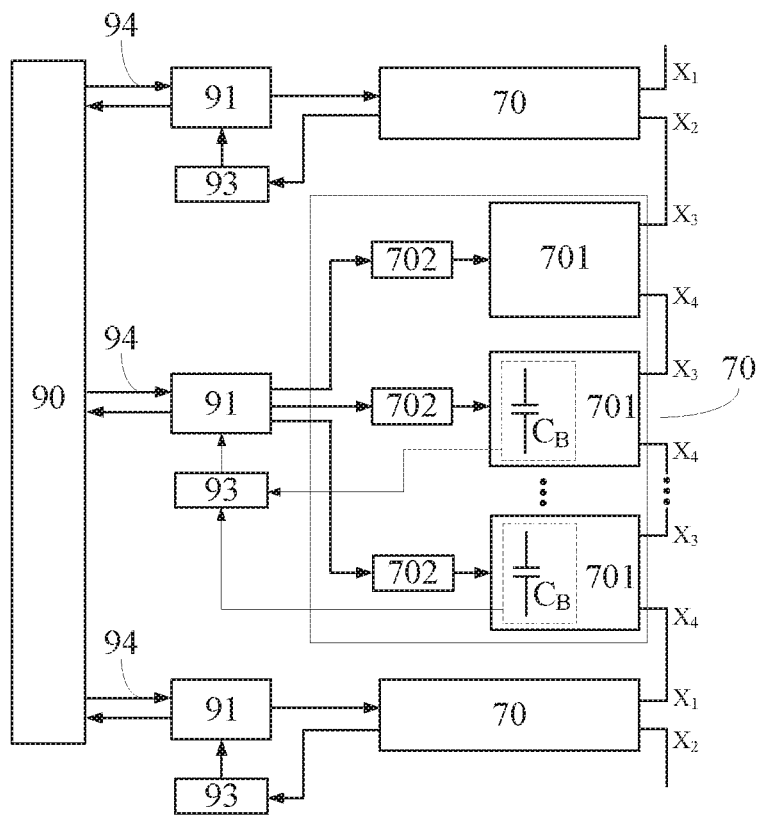
FIG. 21 is a block diagram of a modular power supply system in accordance with another embodiment of the present disclosure.

FIG. 21 is a block diagram of a modular power supply system in accordance with another embodiment of the present disclosure. As shown in FIG. 21, each of the auxiliary power supplies 93 in the modular power supply system of the present embodiment may be configured to get power from a plurality of DC bus capacitors $C_B$ of the power converters 701 of the corresponding power unit 70, to acquire a DC bus voltage on the DC bus capacitor $C_B$. For example, the auxiliary power supply 93 in the middle of FIG. 21 may get power from the DC bus capacitors $C_B$ of two power converters 701. When one of the power converters 701 fails, the auxiliary power supply 93 may still get power from the DC bus capacitor $C_B$ of another normal power converter 701, to achieve getting power with redundancy, which improves the reliability of the modular power system.

Correspondingly, as an embodiment, as shown in FIG. 20 and FIG. 21, the auxiliary power supply 93 in the modular power supply system of the present embodiment may be a DC/DC converter, for example, a buck circuit, a boost circuit, a flyback circuit, an LLC circuits, or the like. The input end of the DC/DC converter is connected to two ends of a DC bus capacitor $C_B$ of any one or more of the power converters 701. The DC/DC converter gets power from the DC bus capacitor $C_B$ of the power converter 701, to acquire a DC bus voltage on the DC bus capacitor $C_B$. The output end of the DC/DC converter is connected to the local controller 91, so as to convert the DC bus voltage to a voltage that supplies power to the local controller 91, such as 24V DC.

Figure 22:
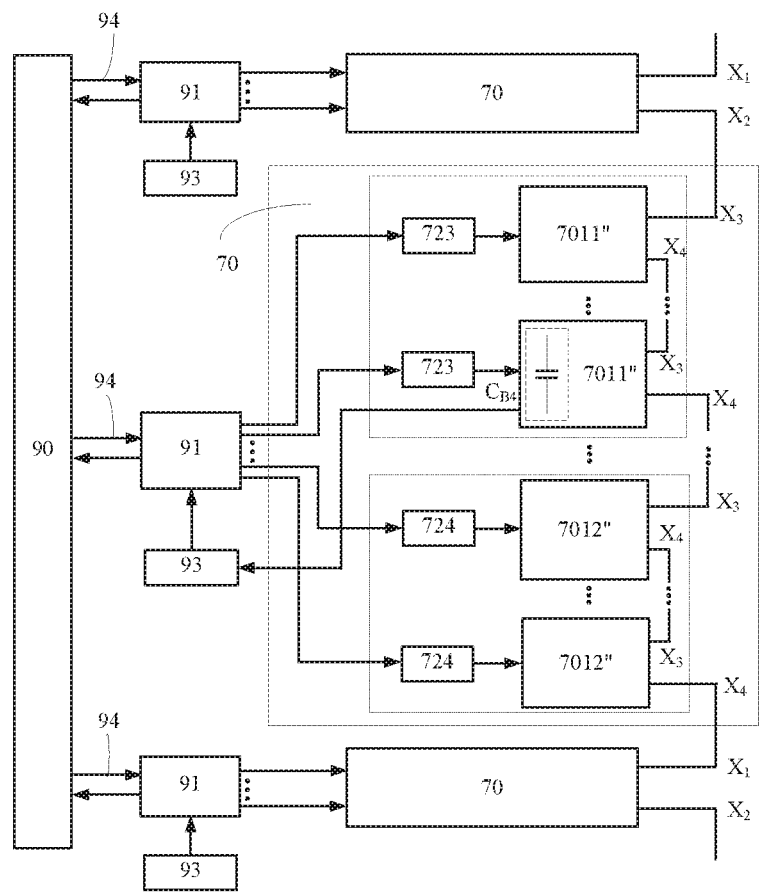
FIG. 22 is a block diagram of a modular power supply system in accordance with another embodiment of the present disclosure.

FIG. 22 is a block diagram of a modular power supply system in accordance with another embodiment of the present disclosure. As shown in FIG. 22, at least one of the aforementioned M power converters in the power unit 70 in the modular power supply system of the present embodiment is a high voltage power converter 7012", and at least one of the aforementioned M power converters in the power unit 70 in the modular power supply system of the present embodiment is a low voltage power converter 7011'". The working voltage of the high voltage power converter 7012" is higher than that of the low voltage power converter 7011". Each of the high voltage power converters 7012" includes at least one high voltage power semiconductor switch. Each low voltage power converter 7011" includes at least one low voltage power semiconductor switch. The working voltage of the high voltage power semiconductor switch is higher than that of the low voltage power semiconductor switch. In this embodiment, the topology of the high voltage power converter 7012" may be one of FIG. 8 to FIG. 14, and the topology of the low voltage power converter 7011" may be one of FIG. 8 to FIG. 14. The topology of the high voltage power converter 7012" may be the same as that of the low voltage power converter 7011", or the topology of the high voltage power converter 7012" may be different from that of the low voltage power converter 7011".

Correspondingly, as an embodiment, as shown in FIG. 22, each power unit 70 in the modular power supply system of the present embodiment further includes at least one high voltage drive circuit 724 and at least one low voltage drive circuit 723. The number of the high voltage drive circuit 724 is equal to that of the aforementioned high voltage power converters 7012". Each of the high voltage drive circuits 724 is connected to corresponding high voltage power semiconductor switches. For example, each high voltage drive circuit 724 is connected to control ends of the high voltage power semiconductor switches. The number of the low voltage drive circuit 723 is equal to that of the aforementioned low voltage power converters 7011". Each of the low voltage drive circuits 723 is connected to corresponding low voltage power semiconductor switches. For example, each low voltage drive circuit 723 is connected to control ends of the low voltage power semiconductor switches. Each of the high voltage drive circuits 724 is configured to receive the corresponding local control signal to output at least one driving signal to respectively control the turn-on and turn-off of the corresponding high voltage power semiconductor switch, so as to adjust a voltage across the third end $X_3$ and the fourth end $X_4$ of the high voltage power converter 7012". For example, the voltage across the third end $X_3$ and the fourth end $X_4$ of the high voltage power converter 7012" is 6 KV. Each low voltage drive circuit 723 is configured to receive the corresponding local control signal to output at least one driving signal to respectively control the turn-on and turn-off of the corresponding low voltage power semiconductor switch, so as to adjust a voltage across the third end $X_3$ and the fourth end $X_4$ of the low voltage power converter 7011". For example, the voltage across the third end $X_3$ and the fourth end $X_4$ of the low voltage power converter 7011" is 1 KV.

As another embodiment, each of the power units 70 in the modular power system of the embodiment further includes at least one high voltage drive circuit 724 and at least one low voltage drive circuit 723. The number of the at least one high voltage drive circuit 724 is equal to that of the at least one high voltage power semiconductor switch. Each of the high voltage drive circuits 724 is connected to the corresponding high voltage power semiconductor switch. Each of the high voltage drive circuits 724 is configured to receive the corresponding local control signal to output a driving signal to control turn-on and turn-off of the corresponding high voltage power semiconductor switch. The number of the at least one low voltage drive circuit 723 is equal to that of the at least one low voltage power semiconductor switch. Each of the low voltage drive circuits 723 is connected to the corresponding low voltage power semiconductor switch. Each of the low voltage drive circuit 723 is configured to receive the corresponding local control signal to output a driving signal, to control turn-on and turn-off of the corresponding low voltage power semiconductor switch.

Correspondingly, as an embodiment, as shown in FIG. 22, the auxiliary power supply 93 in the modular power supply system of the present embodiment may be a DC/DC converter, for example, a buck circuit, a boost circuit, a flyback circuit, an LLC circuit, or the like. The input end of the DC/DC converter is connected to two ends of a DC bus capacitor $C_{B4}$ of any of the low voltage power converters 7011'". The DC bus capacitor $C_{B4}$ may be the DC bus capacitor $C_B$ ($C_B'$) of FIG. 8, FIG. 9, FIG. 13 and FIG. 14, or the DC bus capacitors $C_1$ and $C_2$ of FIGS. 10-12. The input end of the DC/DC converter is connected to the two ends of the DC bus capacitor $C_B$ ($C_B'$), or the input end of the DC/DC converter is connected to the said one end of the DC bus capacitor $C_1$ and the said the other end of the DC bus capacitor $C_2$. The DC/DC converter gets power from the DC bus capacitor $C_{B4}$ of the low voltage power converter 7011" to acquire the DC bus voltage on the DC bus capacitor $C_{B4}$. The output end of the DC/DC converter is connected to the local controller 91, so as to convert the DC bus voltage to a voltage that supplies power to the local controller 91, such as a 24V DC.

Figure 23:
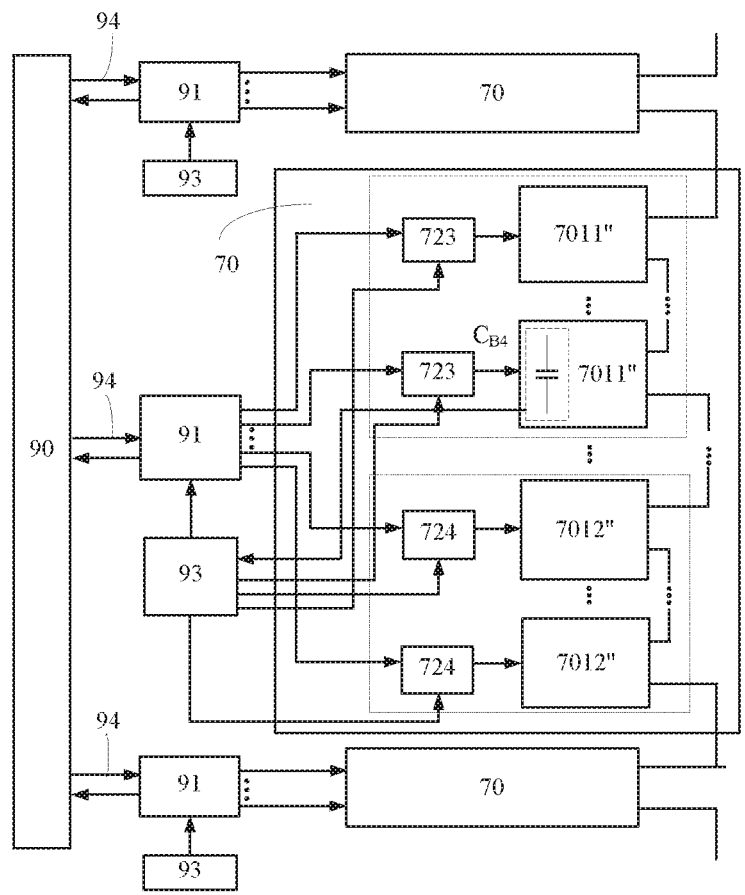
FIG. 23 is a block diagram of a modular power supply system in accordance with another embodiment of the present disclosure.

FIG. 23 is a block diagram of a modular power supply system in accordance with another embodiment of the present disclosure. As shown in FIG. 23, the DC/DC converter as the auxiliary power supply 93, in addition to provide supplying power voltage to the local controller 91, may further be connected to each high voltage drive circuit 724 and each low voltage drive circuits 723, and convert the DC bus voltage to a voltage that supplies power to the high voltage drive circuit 724 or to the low voltage drive circuit 723, such as 24V DC.

In the embodiments shown in FIGS. 22 and 23, the connection of the high voltage power converter 7012" and the low voltage power converter 7011" in one power unit 70 may be interleaved. For example, they are connected in an order of a high voltage power converter, a low voltage power converter, a high voltage power converter, a low voltage power converter, and the like: or in an order of a high voltage power converter, a low voltage power converter, a low voltage power converter, a high voltage power converter, and the like: or in an order of a high voltage power converter, a high voltage power converter, a low voltage power converter, a high voltage power converter, a low voltage power converter, and the like. They may also be connected in a manner that a plurality of low voltage power converters are connected, then connected to a high voltage power converter; or a plurality of high voltage power converters are connected, then connected to a low voltage power converter. The embodiments of the present disclosure do not limit the manner of connection between the at least one high voltage power converter and the at least one low voltage power converter.

In the embodiment of the present disclosure, the scheme of connecting the high voltage power converter and the low voltage power converter in each power unit 70 solves the problem that, when only the low voltage power converters are adopted, the amount of control quantities is too large, the required hardware resources is too much, the cost is too high, and the power density is too low due to a large number of low voltage power converters. Besides, since the input end of the DC/DC converter is connected to the two ends of the DC bus capacitor of the low voltage power converter, the voltage withstand degree of primary and secondary sides of the transformer of the DC/DC converter only needs to be above the DC bus voltage of the low voltage power converter, which avoids the problem of difficulty in implementation technique.

Figure 24:
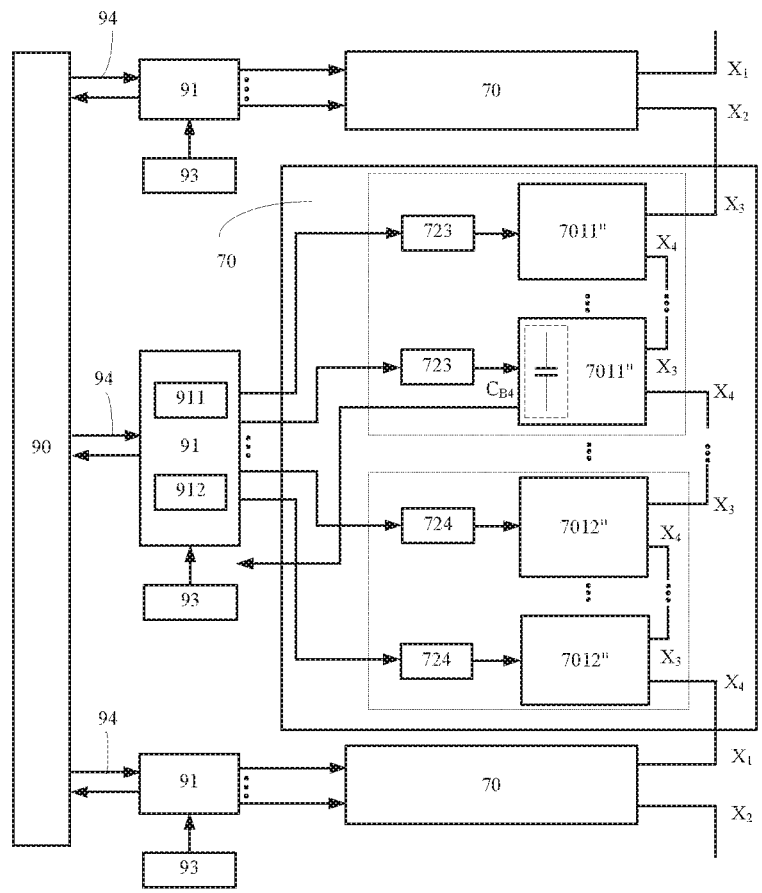
FIG. 24 is a block diagram of a modular power supply system in accordance with another embodiment of the present disclosure.

FIG. 24 is a block diagram of a modular power supply system in accordance with another embodiment of the present disclosure. As shown in FIG. 24, each of the local controllers of the modular power supply system of the present embodiment may include: at least one high voltage control circuit 912, configured to output a local control signal to the corresponding high voltage drive circuit 724; and at least one low voltage control circuit 911, configured to output a local control signal to the corresponding low voltage drive circuit 723. The high voltage control circuit 912 may be one or more. When there are a plurality of high voltage control circuits 912, each high voltage control circuit 912 may be connected to the high voltage drive circuit 724 of each corresponding high voltage power converter 7012", for outputting at least one high voltage control signal to the high voltage drive circuit 724; alternatively, a high voltage control circuit 912 may be connected to the high voltage drive circuits 724 of the plurality of corresponding high voltage power converters 7012", for outputting at least one high voltage control signal to the corresponding high voltage drive circuits 724. When there is one high voltage control circuit 912, the high voltage control circuit 912 is connected to the high voltage drive circuit 724 of each of the high voltage power converters 7012", for outputting at least one high voltage control signal to the corresponding high voltage drive circuit 724. The low voltage control circuit 911 may be one or more. When there are a plurality of low voltage control circuits 911, each low voltage control circuit 911 may be connected to the low voltage drive circuit 723 of each corresponding low voltage power converter 7011", for outputting at least one low voltage control signal to the low voltage drive circuit; alternatively, a low voltage control circuit 911 may be connected to the low voltage drive circuits 723 of the plurality of corresponding low voltage power converters 7011", for outputting at least one low voltage control signal to the corresponding low voltage drive circuits 723. When there is one low voltage control circuit 911, the low voltage control circuit 911 is connected to the low voltage drive circuit 723 of each of the low voltage power converters 7011", for outputting at least one low voltage control signal to the corresponding low voltage drive circuit 723. The high voltage control circuit 912 is in one-to-one correspondence with the high voltage power converter 7012", and the low voltage control circuit 911 is in one-to-one correspondence with the low voltage power converter 7011". As shown in FIG. 24, one high voltage control circuit 912 may correspond to two high voltage power converter 7012", and one low voltage control circuit 911 corresponds to two low voltage power converters 7011", etc., which are not limited in this embodiment of the present disclosure.

In the embodiment of the present disclosure, the at least one high voltage power converter 7012" and the at least one low voltage power converter 7011" may be separately controlled by the at least one high voltage control circuit 912 and the at least one low voltage control circuit 911, thereby reducing the control delay.

Accordingly, in conjunction with FIGS. 22 and 24, each of the auxiliary power supplies 93 may be configured to get power from the DC bus capacitor $C_{B4}$ of the corresponding low voltage power converter 7011", to acquire the DC bus voltage on the DC bus capacitor $C_{B4}$. Since the power is got from the DC bus capacitor $C_{B4}$ of the low voltage power converter 7011", the difficulty in power getting of the auxiliary power supply 93 is lowered. The auxiliary power supply 93 may be a DC/DC converter. The input end of the DC/DC converter may be connected to the two ends of the DC bus capacitor $C_{B4}$ of any low voltage power converter 7011", to acquire the DC bus voltage from the DC bus capacitor $C_{B4}$. The output end of the DC/DC converter may be connected to the high voltage control circuit 912, the low voltage control circuit 911, the high voltage drive circuit 724 and the low voltage drive circuit 723, and convert the DC bus voltage to a voltage (such as a 24V DC) for supplying power to the local controller 91 (or the high voltage control circuit 912 and the low voltage control circuit 911), the high voltage drive circuit 724 or the low voltage drive circuit 723.

The topology of the power converters 701 (7011" and 7012") in FIG. 22 to FIG. 24 may be any one of FIG. 8 to FIG. 14, but not limited thereto, which does not exclude other topologies.

In the present disclosure, by constituting a plurality of power converters as one power unit and adopting a set of local controller, optical fiber and auxiliary power supply to control a plurality of power converters, the number of local controllers, optical fibers and auxiliary power supplies may be reduced, the structural design may be simplified, the cost may be reduced, and the reliability may be improved, greatly.

The present disclosure solves problems that, when cascading low voltage power unit modules is adopted, the amount of control quantities is too large, the required hardware resources is too much, the cost is too high and the power density is too low due to a large number of low voltage power unit modules. Besides, since the input end of at least one DC-to-DC converter is connected to the two ends of the low voltage bus capacitor, the voltage withstand degree of primary and secondary sides of the transformer of the DC-to-DC converter only needs to be above the low voltage DC bus voltage, which avoids the problem of difficulty in implementation technique.

The present disclosure is applicable to all topologies connected by AC/DC, DC/AC or DC/DC power converters, and may be widely used.

The exemplary embodiments of the present disclosure have been particularly shown and described above. It is to be understood that, the disclosure is not limited to the details of the specific structures, arrangements or implementations described herein; rather, the disclosure is intended to cover various modifications and equivalents within the spirit and scope of the appended claims. It should be further noted that, the above embodiments are merely illustrative of the technical solutions of the present disclosure, and are not intended to be limiting; although the present disclosure has been described in detail with reference to the foregoing embodiments, those skilled in the art will understand that the technical solutions described in the foregoing embodiments may be modified, or some or all of the technical features may be equivalently replaced; and the modifications or substitutions do not depart from the scope of the technical solutions of the embodiments of the present disclosure.

What is claimed is:

1. A modular power supply system, configured to comprise:
    a main controller, configured to output a main control signal;
    N local controllers, wherein each of the local controllers is configured to receive the main control signal to output at least one local control signal;
    N auxiliary power supplies, in one-to-one correspondence with the N local controllers, wherein each of the auxiliary power supplies is configured to provide power to the corresponding local controller; and
    N power units, in one-to-one correspondence with the N local controllers, wherein each of the power units comprises a first end and a second end, the second end of each of the power units is connected to the first end of an adjacent one of the power units, and each of the N power units is configured to comprise M power converters, wherein each of the power converters comprises a third end and a fourth end, the fourth end of each of the power converters is connected to the third end of an adjacent one of the power converters, and the third end of a first one of the power converters is connected to the first end of the power unit, the fourth end of an M-th one of the power converters is connected to the second end of the power unit, and each of the power converters is configured to operate according to the local control signal output by the corresponding local controller,
    wherein both N and M are natural numbers greater than one,
    wherein the N auxiliary power supplies are in one-to-one correspondence with the N power units,
    wherein at least one of the M power converters in the power unit is a high voltage power converter, at least one of the M power converters in the power unit is a low voltage power converter, a working voltage of the high voltage power converter is higher than that of the low voltage power converter, each of the high voltage power converters comprises at least one high voltage power semiconductor switch, each of the low voltage power converters comprises at least one low voltage power semiconductor switch, and a working voltage of the high voltage power semiconductor switch is higher than that of the low voltage power semiconductor switch, and
    wherein each of the auxiliary power supplies is configured to get power from a DC bus capacitor of one of the low voltage power converters or from DC bus capacitors of a plurality of the low voltage power converters of the corresponding power unit, to acquire a DC bus voltage on the DC bus capacitor.

2. The modular power supply system of claim 1, wherein each of the power units further comprises at least one high voltage drive circuit and at least one low voltage drive circuit, a number of the at least one high voltage drive circuit is in one-to-one correspondence with the at least one high voltage power converter, each of the high voltage drive circuits is connected to the corresponding high voltage power semiconductor switches, and each of the high voltage drive circuits is configured to receive the corresponding local control signal to output at least one driving signal to control the corresponding high voltage power semiconductor switches respectively; and the at least one low voltage drive circuit is in one-to-one correspondence with the at least one low voltage power converter, each of the low voltage drive circuits is connected to the corresponding low voltage power semiconductor switches, and each of the low voltage drive circuit is configured to receive the corresponding local control signal to output at least one driving signal to control the corresponding low voltage power semiconductor switches respectively.

3. The modular power supply system of claim 1, wherein each of the power units further comprises at least one high voltage drive circuit and at least one low voltage drive circuit, a number of the at least one high voltage drive circuit is equal to that of the at least one high voltage power semiconductor switch, each of the high voltage drive circuits is connected to the corresponding high voltage power semiconductor switch, and each of the high voltage drive circuits is configured to receive the corresponding local control signal to output a driving signal to control the corresponding high voltage power semiconductor switch; and a number of the at least one low voltage drive circuit is equal to that of the at least one low voltage power semiconductor switch, each of the low voltage drive circuits is connected to the corresponding low voltage power semiconductor switch, and each of the low voltage drive circuit is configured to receive the corresponding local control signal to output a driving signal to control the corresponding low voltage power semiconductor switch.

4. The modular power system of claim 2, wherein each of the corresponding local controllers comprises:
    a high voltage control circuit, configured to output the local control signal to the corresponding high voltage drive circuit; and
    a low voltage control circuit, configured to output the local control signal to the corresponding low voltage drive circuit.

5. The modular power supply system of claim 1, wherein each of the auxiliary power supplies is a DC/DC converter, and the DC/DC converter receives the DC bus voltage on the DC bus capacitor and converts the DC bus voltage to a voltage for supplying power for the corresponding local controller.

6. The modular power supply system of claim 2, wherein each of the auxiliary power supplies is a DC/DC converter, the DC/DC converter receives the DC bus voltage on the DC bus capacitor and converts the DC bus voltage to a voltage for supplying power for the corresponding local controller, or the DC/DC converter receives the DC bus voltage on the DC bus capacitor and converts the DC bus voltage to a voltage for supplying power for the corresponding local controller, the high voltage drive circuit and the low voltage drive circuit.

7. The modular power supply system of claim 1, wherein the power converter is any one of an AC/DC converter, a DC/AC converter and a DC/DC converter.

8. The modular power supply system of claim 1, wherein DC bus voltages of the M power converters are partially identical, or all different from each other.

9. The modular power supply system of claim 1, wherein topologies of the M power converters are all identical or partially identical.

10. The modular power supply system of claim 1, wherein the topology of all of the M power converters in each of the power units is any one kind of a full-bridge converter, a half-bridge converter, a neutral point clamped three-level converter, a diode clamping three-level converter, a flying capacitor three-level converter, a full-bridge resonant converter and a half-bridge resonant converter.

11. The modular power supply system of claim 1, wherein the topologies of the M power converters in each of the power units are a combination of two or more kinds of a full-bridge converter, a half-bridge converter, a neutral point clamped three-level converter, a diode clamping three-level converter, a flying capacitor three-level converter, a full-bridge resonant converter and a half-bridge resonant converter.

12. The modular power supply system of claim 3, wherein each of the corresponding local controllers comprises:
- a high voltage control circuit, configured to output the local control signal to the corresponding high voltage drive circuit; and
- a low voltage control circuit, configured to output the local control signal to the corresponding low voltage drive circuit.

13. The modular power supply system of claim 3, wherein each of the auxiliary power supplies is a DC/DC converter, the DC/DC converter receives the DC bus voltage on the DC bus capacitor and converts the DC bus voltage to a voltage for supplying power for the corresponding local controller, or the DC/DC converter receives the DC bus voltage on the DC bus capacitor and converts the DC bus voltage to a voltage for supplying power for the corresponding local controller, the high voltage drive circuit and the low voltage drive circuit.

* * * * *